United States Patent
Sundararajan et al.

(10) Patent No.: US 10,285,189 B2
(45) Date of Patent: May 7, 2019

(54) FIFTH GENERATION (5G) TIME DIVISION DUPLEX (TDD) LEGACY COEXISTENCE DESIGN

(71) Applicant: QUALCOMM Incorporated, San Diego, CA (US)

(72) Inventors: Jay Kumar Sundararajan, San Diego, CA (US); Joseph Binamira Soriaga, San Diego, CA (US); Jing Jiang, San Diego, CA (US); Tingfang Ji, San Diego, CA (US); Alexandros Manolakos, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 15/291,626

(22) Filed: Oct. 12, 2016

(65) Prior Publication Data

US 2017/0295589 A1 Oct. 12, 2017

Related U.S. Application Data

(60) Provisional application No. 62/320,586, filed on Apr. 10, 2016.

(51) Int. Cl.
*H04W 72/04* (2009.01)
*H04W 74/00* (2009.01)
(Continued)

(52) U.S. Cl.
CPC ............ *H04W 72/1215* (2013.01); *H04L 5/14* (2013.01); *H04L 25/08* (2013.01); *H04L 69/22* (2013.01);
(Continued)

(58) Field of Classification Search
CPC ............ H04W 72/12; H04W 75/1205; H04W 72/121; H04W 72/1215; H04W 72/1263;
(Continued)

(56) References Cited

U.S. PATENT DOCUMENTS

2016/0233904 A1  8/2016  Wu et al.
2017/0272221 A1*  9/2017  Yi ........................ H04L 5/0048
(Continued)

FOREIGN PATENT DOCUMENTS

WO  WO-2014057604 A1  4/2014
WO  WO-2014109683 A1  7/2014
WO  WO-2015020604 A1  2/2015

OTHER PUBLICATIONS

International Search Report and Written Opinion—PCT/US2017/026653—ISA/EPO—dated Aug. 29, 2017.
(Continued)

*Primary Examiner* — Ashley Shivers
(74) *Attorney, Agent, or Firm* — Loza & Loza, LLP

(57) ABSTRACT

Aspects of the disclosure relate to a configurable subframe structure for use in next generation (e.g., fifth generation or 5G) wireless networks utilizing a time division duplex (TDD) carrier that minimizes interference with adjacent legacy wireless networks. The configurable subframe structure may be configured to produce next generation subframes, each including at least one of a downlink portion or an uplink portion, to substantially align downlink portions with corresponding legacy downlink subframes and/or uplink portions with corresponding legacy uplink subframes.

28 Claims, 23 Drawing Sheets

(51) Int. Cl.
*H04W 72/12* (2009.01)
*H04L 5/14* (2006.01)
*H04L 25/08* (2006.01)
*H04L 29/06* (2006.01)

(52) U.S. Cl.
CPC ... *H04W 72/1268* (2013.01); *H04W 72/1278* (2013.01); *H04W 74/002* (2013.01); *H04W 72/042* (2013.01); *H04W 72/0413* (2013.01)

(58) Field of Classification Search
CPC ......... H04W 72/1268; H04W 72/1273; H04W 72/1278; H04W 74/00; H04W 74/04; H04W 74/002; H04W 74/006
See application file for complete search history.

(56) References Cited

U.S. PATENT DOCUMENTS

2017/0289917 A1* 10/2017 Visotsky ............... H04W 16/28
2018/0220407 A1* 8/2018 Xiong .................... H04L 5/001

OTHER PUBLICATIONS

Shen Z., et al., "Dynamic Uplink-Downlink Configuration and Interference Management in TD-LTE," IEEE Communications Magazine, IEEE Service Center, Piscataway, US, vol. 50, No. 11, XP011472335, Nov. 1, 2012, pp. 51-59.

* cited by examiner

FIFTH GENERATION (5G) TIME DIVISION DUPLEX (TDD) LEGACY COEXISTENCE DESIGN

PRIORITY CLAIM

This application claims priority to and the benefit of Provisional Patent Application No. 62/320,586 filed in the U.S. Patent and Trademark Office on Apr. 10, 2016, the entire content of which is incorporated herein by reference as if fully set forth below in its entirety and for all applicable purposes.

TECHNICAL FIELD

The technology discussed below relates generally to wireless communication networks, and more particularly, to coexistence between legacy and fifth generation (5G) wireless communication networks. Embodiments can enable techniques for utilizing time division duplex (TDD) carriers in legacy and 5G wireless communication networks.

INTRODUCTION

Next generation (e.g., fifth generation or 5G) wireless communication networks may utilize time division duplex (TDD) carriers for both uplink and downlink communication. To meet the demands for low latency (e.g., 1 ms or less) in 5G TDD wireless communication networks, spontaneous switching of link directions and self-contained subframe configurations may be supported. Self-contained subframes may include both uplink information (e.g., uplink control and/or data) and downlink information (e.g., downlink control and/or data) to reduce the retransmission timeline, thereby reducing the latency.

Current legacy (e.g., third generation (3G) or fourth generation (4G)) wireless communication networks implementing TDD typically utilize large downlink and uplink transmission durations to minimize link direction switching. In addition, legacy wireless networks may not support self-contained subframe configurations. Therefore, neighboring legacy and next generation wireless communication networks with co-channel or tightly adjacent channel transmissions may experience interference. For example, downlink transmissions in one wireless network may interfere with uplink transmissions in the other wireless network. Similarly, uplink transmissions in one wireless network may interfere with downlink transmissions in the other wireless network.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure relate to mechanisms for minimizing interference between adjacent legacy and next generation (5G) wireless networks utilizing a configurable subframe structure within next generation (5G) wireless networks. The configurable subframe structure may be configured to produce next generation subframes, each including at least one of a downlink portion or an uplink portion, to substantially align downlink portions with corresponding legacy downlink subframes and/or uplink portions with corresponding legacy uplink subframes.

In one aspect, a method of communication between a scheduling entity and a set of one or more subordinate entities in a wireless communication network is disclosed. The method includes identifying a first subframe configuration of at least one first subframe to be transmitted in a first cell utilizing a first radio access technology (RAT), where the at least one first subframe configuration includes at least one of a first downlink portion or a first uplink portion, and providing a configurable subframe structure for a time division duplex (TDD) carrier utilized in a second cell adjacent the first cell, where the second cell utilizes a second radio access technology (RAT) and the configurable subframe structure includes at least one of a second downlink portion or a second uplink portion. The method further includes configuring the configurable subframe structure to produce a second subframe for transmission in the second cell substantially simultaneous to transmission of the at least one first subframe in the first cell, where the second subframe includes at least one of the second downlink portion or the second uplink portion, and communicating between the scheduling entity and the set of one or more subordinate entities using the second subframe. At least one of the second downlink portion of the second subframe is transmitted within a downlink transmit time of the first downlink portion of the at least one first subframe or the second uplink portion of the second subframe is transmitted within an uplink transmit time of the first uplink portion of the at least one first subframe.

Another aspect of the disclosure provides a scheduling entity in a wireless communication network. The scheduling entity includes a transceiver for wirelessly communicating with a set of one or more subordinate entities utilizing a time division duplex (TDD) carrier, a memory, and a processor communicatively coupled to the transceiver and the memory. The processor is configured to identify a first subframe configuration of at least one first subframe to be transmitted in a first cell utilizing a first radio access technology (RAT), where the at least one first subframe configuration includes at least one of a first downlink portion or a first uplink portion, and provide a configurable subframe structure for a time division duplex (TDD) carrier utilized in a second cell adjacent the first cell, where the second cell utilizes a second radio access technology (RAT) and the configurable subframe structure includes at least one of a second downlink portion or a second uplink portion. The processor is further configured to configure the configurable subframe structure to produce a second subframe for transmission in the second cell substantially simultaneous to transmission of the at least one first subframe in the first cell, where the second subframe includes at least one of the second downlink portion or the second uplink portion, and communicate between the scheduling entity and the set of one or more subordinate entities using the second subframe. At least one of the second downlink portion of the second subframe is transmitted within a downlink transmit time of the first downlink portion of the at least one first subframe or the second uplink portion of the second subframe is transmitted within an uplink transmit time of the first uplink portion of the at least one first subframe.

Another aspect of the disclosure provides a scheduling entity apparatus in a wireless communication network. The scheduling entity apparatus includes means for identifying a first subframe configuration of at least one first subframe to be transmitted in a first cell utilizing a first radio access technology (RAT), where the at least one first subframe configuration includes at least one of a first downlink portion or a first uplink portion, and means for providing a configurable subframe structure for a time division duplex (TDD) carrier utilized in a second cell adjacent the first cell, where the second cell utilizes a second radio access technology (RAT) and the configurable subframe structure includes at least one of a second downlink portion or a second uplink portion. The scheduling entity apparatus further includes means for configuring the configurable subframe structure to produce a second subframe for transmission in the second cell substantially simultaneous to transmission of the at least one first subframe in the first cell, where the second subframe includes at least one of the second downlink portion or the second uplink portion, and means for communicating between the scheduling entity and the set of one or more subordinate entities using the second subframe. At least one of the second downlink portion of the second subframe is transmitted within a downlink transmit time of the first downlink portion of the at least one first subframe or the second uplink portion of the second subframe is transmitted within an uplink transmit time of the first uplink portion of the at least one first subframe.

Examples of additional aspects of the disclosure follow. In some aspects of the disclosure, the method further includes determining a first duration of the at least one first subframe, and configuring the configurable subframe structure to produce the second subframe having a second duration substantially equal to the first duration.

In some aspects of the disclosure, the at least one first subframe includes the first downlink portion. The configurable subframe may then be configured to produce the second subframe including the second downlink portion to be transmitted within the downlink transmit time of the first downlink portion of the at least one first subframe. The second downlink portion may include at least one of a downlink control portion for transmitting downlink control information from the scheduling entity to the set of one or more subordinate entities and a downlink data portion for transmitting downlink data from the scheduling entity to the set of one of or more subordinate entities.

In some aspects of the disclosure, the method further includes configuring the configurable subframe structure to produce the second subframe structure including a guard period following the downlink data portion and the second uplink portion following the guard period. The second uplink portion is further transmitted within the downlink transmit time of the first downlink portion of the at least one first subframe and the second uplink portion includes an uplink control portion for transmitting uplink control information from the set of one or more subordinate entities to the scheduling entity.

In some aspects of the disclosure, the method further includes receiving the uplink control information within a narrow frequency band of an in-band frequency range over which the second subframe is transmitted, where the narrow frequency band occupies only a portion of the in-band frequency range. In some aspects of the disclosure, the method further includes receiving the uplink control information over a first component carrier separated by a guard band from a second component carrier over which the at least one first subframe is transmitted. In some aspects of the disclosure, the uplink control information is received at a first transmit power when the second uplink portion is received within the uplink transmit time of the first uplink portion of the at least one first subframe and at a second transmit power less than the first transmit power when the uplink control portion is transmitted within the downlink transmit time of the first downlink portion of the first subframe.

In some aspects of the disclosure, the method further includes including uplink acknowledgement information within the uplink control portion of the second subframe, where the uplink acknowledgement information provides an acknowledgement or negative acknowledgement of the downlink data transmitted in the second subframe.

In some aspects of the disclosure, the method further includes configuring the configurable subframe structure to produce the second subframe having a guard period following the downlink control portion and the second uplink portion following the guard period, where the second uplink portion is transmitted within the downlink transmit time of the first downlink portion of the at least one first subframe. The second uplink portion may include an uplink data portion for transmitting uplink data from the set of one or more subordinate entities to the scheduling entity and an uplink control portion for transmitting uplink control information from the set of one or more subordinate entities to the scheduling entity. In some aspects of the disclosure, the uplink data and the uplink control information are received at a first transmit power when the second uplink portion is received within the uplink transmit time of the first uplink portion of the at least one first subframe, and are received at a second transmit power less than the first power when the uplink data and the uplink control information are transmitted within the downlink transmit time of the first downlink portion of the at least one first subframe.

In some aspects of the disclosure, the second subframe includes the downlink control portion and the downlink data portion, and the method further includes muting the second uplink portion in the second subframe.

In some aspects of the disclosure, the at least one first subframe includes the first uplink portion. The configurable subframe may then be configured to produce the second subframe including the second uplink portion to be transmitted within the uplink transmit time of the first uplink portion of the at least one first subframe. The second uplink portion may include at least one of an uplink control portion for transmitting uplink control information from the set of one or more subordinate entities to the scheduling entity and an uplink data portion for transmitting uplink data from the set of one or more subordinate entities to the scheduling entity.

In some aspects of the disclosure, the method further includes configuring the configurable subframe structure to produce the second subframe including a guard period immediately prior to the uplink data portion and the second downlink data portion immediately prior to the guard period. The second downlink data portion is further transmitted within the uplink transmit time of the first uplink portion of the at least one first subframe and the second downlink portion includes a downlink control portion for transmitting downlink control information from the scheduling entity to the set of one or more subordinate entities.

In some aspects of the disclosure, the method further includes transmitting the downlink control information within a narrow frequency band of an in-band frequency range over which the second subframe is transmitted, where the narrow frequency band occupies only a portion of the in-band frequency range. In some aspects of the disclosure, the method further includes transmitting the downlink control information over a first component carrier separated by a guard band from a second component carrier over which the at least one first subframe is transmitted. In some aspects of the disclosure, the downlink control information is transmitted at a first transmit power when the second downlink portion is transmitted within the downlink transmit time of the first downlink portion of the at least one first subframe and at a second transmit power less than the first transmit power when the downlink control information is transmitted within the uplink transmit time of the first uplink portion of the at least one first subframe.

In some aspects of the disclosure, the method further includes configuring the configurable subframe structure to produce the second subframe including a guard period immediately prior to the uplink control portion and the second downlink portion immediately prior to the guard period. The second downlink portion is transmitted within the uplink transmit time of the first uplink portion of the at least one first subframe and includes a downlink data portion for transmitting downlink data from the set of one or more subordinate entities to the scheduling entity and a downlink control portion for transmitting downlink control information from the set of one or more subordinate entities to the scheduling entity. In some aspects of the disclosure, the downlink data and the downlink control information are transmitted at a first transmit power when the second downlink portion is transmitted within the downlink transmit time of the first downlink portion of the at least one first subframe, and at a second transmit power less than the first power when the downlink data and the downlink control information are transmitted within the uplink transmit time of the first uplink portion of the at least one first subframe.

In some aspects of the disclosure, the second subframe includes the uplink control portion and the uplink data portion, and the method further includes muting the second downlink portion in the second subframe.

In some aspects of the disclosure, the method further includes determining a transmission direction sequence of a plurality of consecutive first subframes to be transmitted in the first cell. In some aspects of the disclosure, the method further includes configuring the configurable subframe structure to produce a plurality of consecutive second subframes matching the transmission direction sequence of the plurality of consecutive first subframes. In some aspects of the disclosure, the method further includes producing the second subframe comprised of a plurality of transmission time interval structures matching the transmission direction sequence of the plurality of consecutive first subframes, where each of the plurality of transmission time interval structures includes at least one of the second downlink portion or the second uplink portion. In some aspects of the disclosure, the method further includes communicating a second subframe configuration of the second subframe to the set of one or more subordinate entities.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
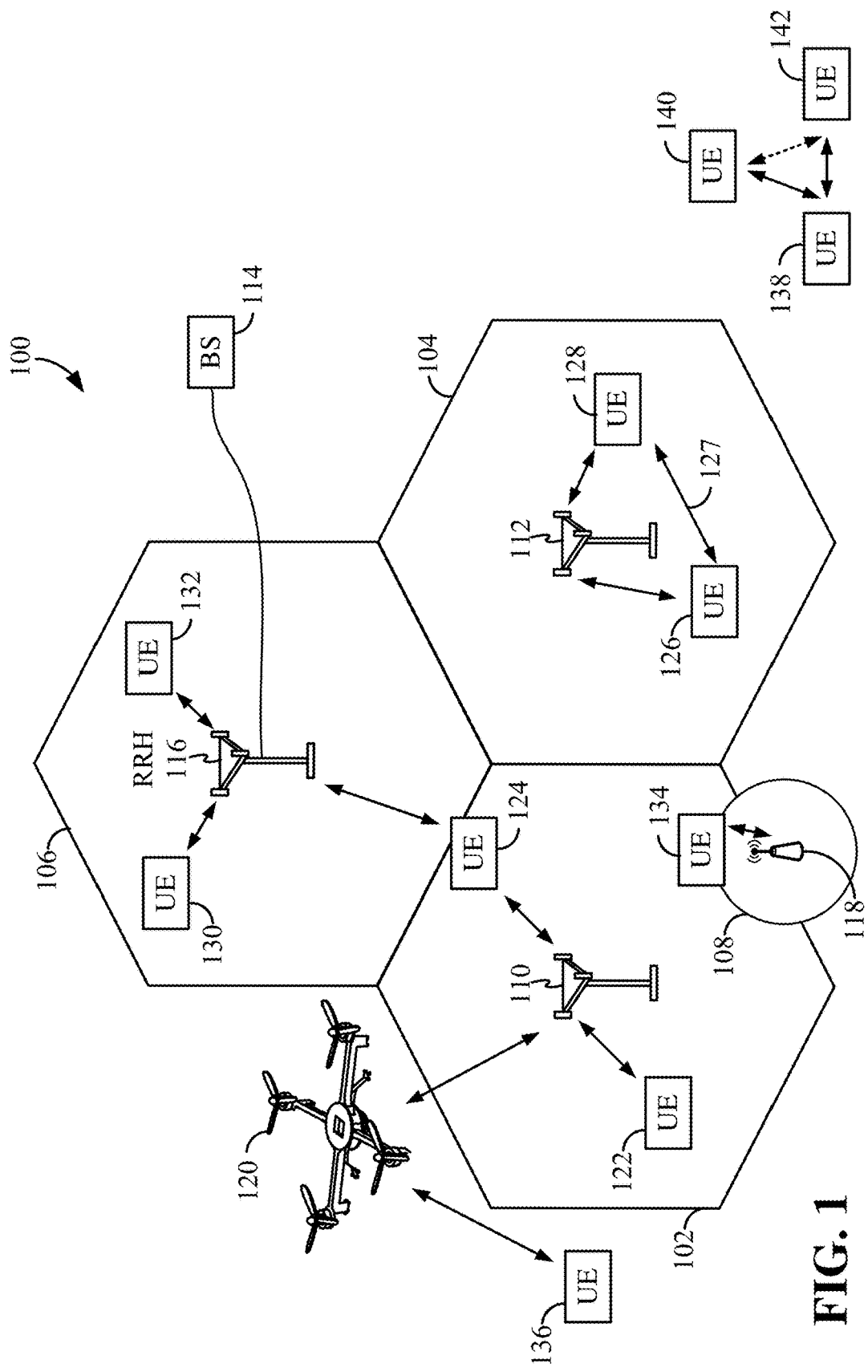
FIG. 1 is a conceptual diagram illustrating an example of a wireless access network.

The various concepts presented throughout this disclosure may be implemented across a broad variety of telecommunication systems, network architectures, and communication standards. Referring now to FIG. 1, as an illustrative example without limitation, a simplified schematic illustration of a wireless access network 100 is provided. The wireless access network 100 may be a legacy access network utilizing a legacy radio access technology (RAT) or a next generation access network utilizing a next generation RAT. The wireless access network 100 may further be coupled to a core network (not shown), which may also be a legacy core network or next generation core network.

As used herein, the term legacy access network or legacy RAT refers to a network or RAT employing a third generation (3G) wireless communication technology based on a set of standards that complies with the International Mobile Telecommunications-2000 (IMT-2000) specifications or a fourth generation (4G) wireless communication technology based on a set of standards that comply with the International Mobile Telecommunications Advanced (ITU-Advanced) specification. For example, some the standards promulgated by the 3$^{rd}$ Generation Partnership Project (3GPP) and the 3$^{rd}$ Generation Partnership Project 2 (3GPP2) may comply with IMT-2000 and/or ITU-Advanced. Examples of such legacy standards defined by the 3$^{rd}$ Generation Partnership Project (3GPP) include, but are not limited to, Long-Term Evolution (LTE), LTE-Advanced, Evolved Packet System (EPS), and Universal Mobile Telecommunication System (UMTS). Additional examples of various radio access technologies based on one or more of the above-listed 3GPP standards include, but are not limited to, Universal Terrestrial Radio Access (UTRA), Evolved Universal Terrestrial Radio Access (eUTRA), General Packet Radio Service (GPRS) and Enhanced Data Rates for GSM Evolution (EDGE). Examples of such legacy standards defined by the 3$^{rd}$ Generation Partnership Project 2 (3GPP2) include, but are not limited to, CDMA2000 and Ultra Mobile Broadband (UMB). Other examples of standards employing 3G/4G wireless communication technology include the IEEE 802.16 (WiMAX) standard and other suitable standards.

As further used herein, the term next generation access network or next generation RAT generally refers to a network or RAT employing continued evolved wireless communication technologies. This may include, for example, a fifth generation (5G) wireless communication technology based on a set of standards. The standards may comply with the guidelines set forth in the 5G White Paper published by the Next Generation Mobile Networks (NGMN) Alliance on Feb. 17, 2015. For example, standards that may be defined by the 3GPP following LTE-Advanced or by the 3GPP2 following CDMA2000 may comply with the NGMN Alliance 5G White Paper. Standards may also include pre-3GPP efforts specified by Verizon Technical Forum (www.vstgf) and Korea Telecom SIG (www.kt5g.org).

The geographic region covered by the wireless access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B (eNB), or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus or UE need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus or UE may additionally be an "Internet of things" (IoT) device such as an automotive or other transportation vehicle, a satellite radio, a global positioning system (GPS) device, a logistics controller, a drone, a multi-copter, a quad-copter, a consumer and/or wearable device, such as eyewear, a wearable camera, a smart watch, a health or fitness tracker, a digital audio player (e.g., MP3 player), a camera, a game console, etc. An IoT device may additionally be a digital home or smart home device such as a home audio, video, and/or multimedia device, an appliance, a sensor, a vending machine, intelligent lighting, a home security system, a smart meter, etc. A mobile apparatus or UE may additionally be a smart energy or security device, a solar panel or solar array, municipal lighting, water, or other infrastructure; industrial automation and enterprise device, etc. Still further, a mobile apparatus or UE may provide for telemedicine support, or health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or data from a base station (e.g., base station 110) to one or more UEs (e.g., UEs 122 and 124) may be referred to as downlink (DL) transmission, while transmissions of control information and/or data originating at a UE (e.g., UE 122) may be referred to as uplink (UL) transmissions. In addition, the uplink and/or downlink control information and/or data may be transmitted in transmission time intervals (TTIs). As used herein, the term TTI refers to the period of time in which a block of data, corresponding to a collection of symbols to be processed at the Media Access Control (MAC) layer and above, is transferred by the physical layer onto the radio interface. In some examples, a TTI may be equal to the duration of a subframe. In other examples, a subframe may include multiple TTIs. Thus, the duration of a TTI may be scalable, and the number symbols within a particular TTI may be determined from the TTI duration. In some examples, multiple subframes may be grouped together to form a single frame. Any suitable number of subframes may occupy a frame. In addition, a subframe may have any suitable duration (e.g., 250 µs, 500 µs, 1 ms, etc.).

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In some examples, an access network 100 may utilize DL-based mobility or UL-based mobility to enable mobility and handovers from one cell to another. In a network configured for DL-based mobility, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals may be utilized by the network to select a serving cell for a UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In some examples, access to the air interface may be scheduled, where a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, UEs or subordinate entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
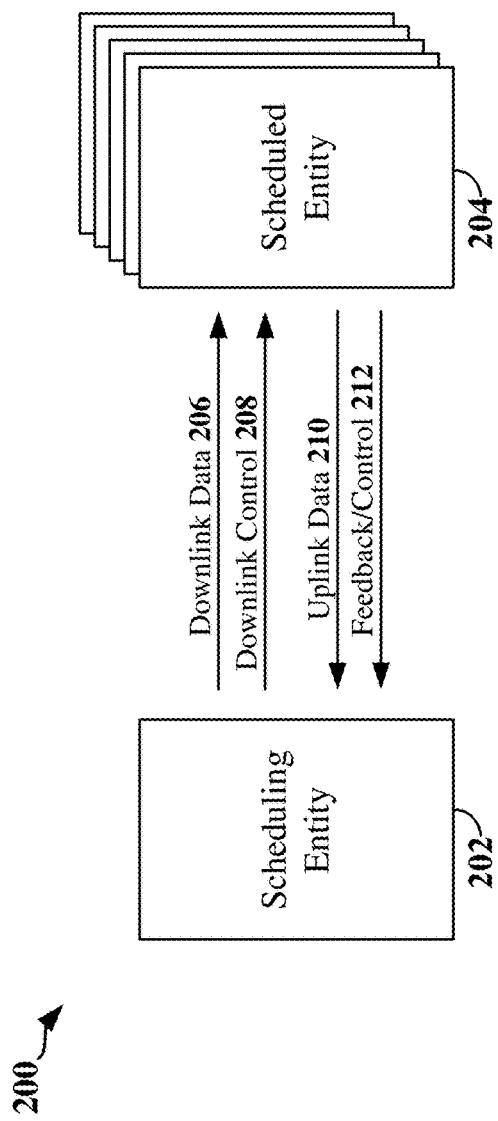
FIG. 2 is a block diagram conceptually illustrating an example of a scheduling entity communicating with one or more subordinate entities according to some embodiments.

Thus, in a wireless communication network with a scheduled access to time-frequency resources and having a cellular configuration, a P2P configuration, and a mesh configuration, a scheduling entity and one or more subordinate entities may communicate utilizing the scheduled resources. Referring now to FIG. 2, a block diagram illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the scheduled entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), CSI-RS (Channel State Information-Reference Signal), etc., to one or more subordinate entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink data 210 and/or downlink data 206 including one or more data channels, such as a physical downlink shared channel (PDSCH) or a physical uplink shared channel (PUSCH) (and, in some examples, system information blocks (SIBs)), may be additionally transmitted between the scheduling entity 202 and the scheduled entity 204. Transmissions of the control and data information may be organized by subdividing a carrier, in time, into suitable transmission time intervals (TTIs).

Furthermore, the subordinate entities 204 may transmit uplink control information 212 including one or more uplink control channels to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the subframe for uplink packet transmissions. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

The channels or carriers illustrated in FIG. 2 are not necessarily all of the channels or carriers that may be utilized between a scheduling entity 202 and subordinate entities 204, and those of ordinary skill in the art will recognize that other channels or carriers may be utilized in addition to those illustrated, such as other data, control, and feedback channels.

In addition, each of the uplink and/or downlink channels illustrated in FIG. 2 may be transmitted in one or more transmission time intervals (TTIs). In some examples, a TTI may be equal to the duration of a time division duplex (TDD) subframe. In other examples, a TDD subframe may include multiple TTIs. In next generation (5G) wireless networks, each TDD next generation subframe may carry both downlink information and uplink information to reduce latency in the wireless network. In some examples, next generation subframes may be entirely self-contained, meaning that acknowledgement information (e.g., ACK/NACK signals) may be transmitted in the same subframe as the data being acknowledged. For example, a subframe carrying downlink data may also include uplink acknowledgement information corresponding to the downlink data (e.g., ACK/NACK signals for all of the downlink data packets within the subframe). Similarly, a subframe carrying uplink data may also include downlink acknowledgement information corresponding to the uplink data (e.g., ACK/NACK signals for all of the uplink data packets within the subframe). In other examples, next generation wireless networks may support an interlaced mode of operation, where two or more TDD next generation subframes are utilized to transmit the control, data and acknowledgement information.

Figure 3:
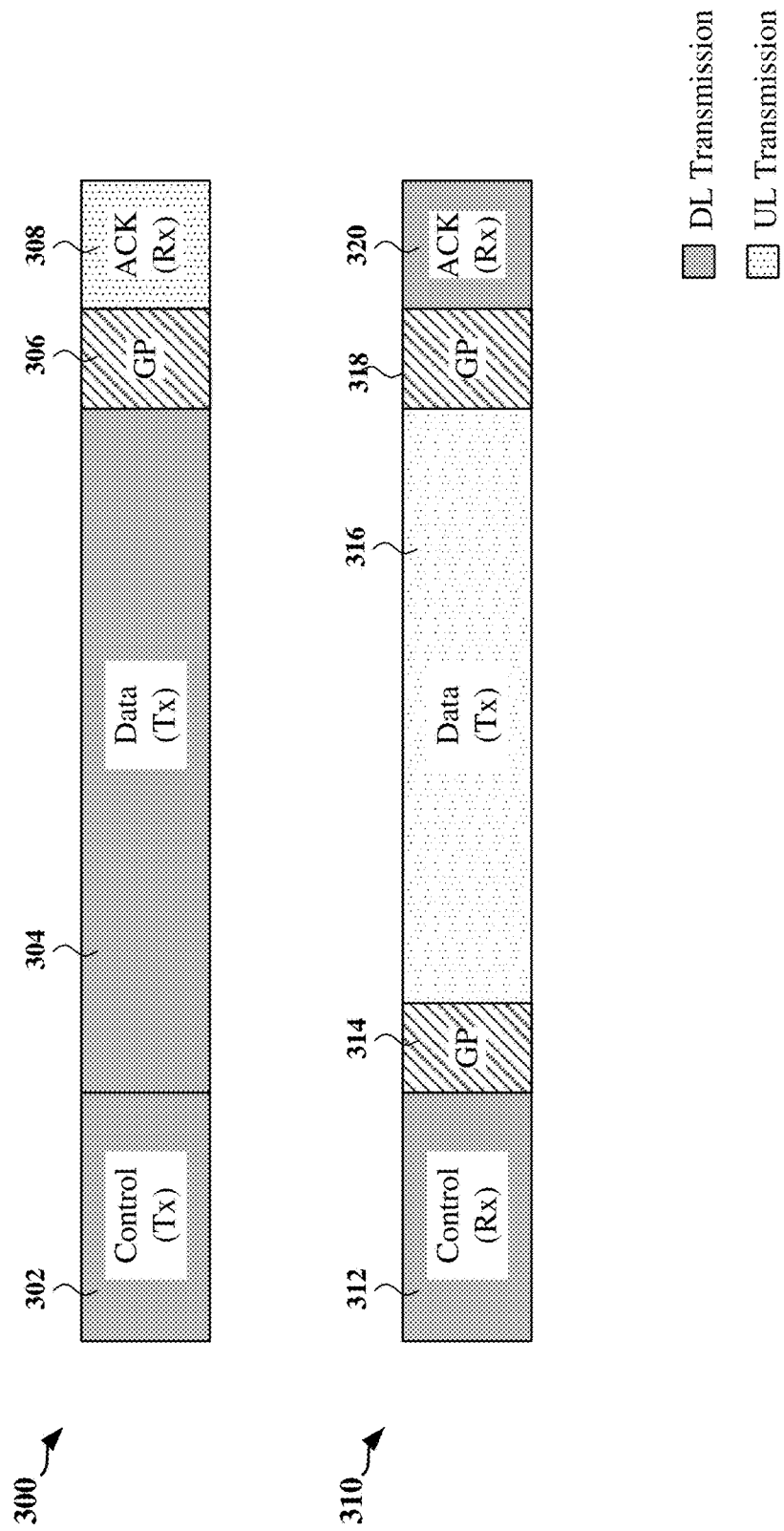
FIG. 3 is a diagram illustrating exemplary structures of self-contained downlink-centric (DL-centric) and uplink-centric (UL-centric) subframes that may be used in some wireless communication networks.

FIG. 3 illustrates exemplary structures of TDD next generation (5G) self-contained subframes 300 and 310. A transmitter-scheduled subframe, referred to herein as a downlink subframe or DL-centric subframe 300, may be used to carry control, data and/or scheduling information to a scheduled entity, which may be a UE for example. A receiver-scheduled subframe, referred to herein as an uplink subframe or UL-centric subframe 310, may be used to receive control data from the scheduling entity, transmit data to a scheduling entity, and receive an ACK/NACK signal for the transmitted data.

In the context of a multiple access network, channel resources are generally scheduled, and each entity is synchronous. That is, each node utilizing the network coordinates its usage of the resources such that transmissions are only made during the allocated portion of the frame, and the time of each allocated portion is synchronized among the different nodes. One node acts as a scheduling entity. The scheduling entity may be a base station or access point, or a UE in a device-to-device (D2D) and/or mesh network. The scheduling entity manages the resources on the carrier and assigns resources to other users of the channel, including subordinate or scheduled entities, such as one or more UEs in a cellular network.

Each subframe is divided into transmit (Tx) and receive (Rx) portions. In the DL-centric subframe 300, the scheduling entity first has an opportunity to transmit control information in the control information portion 302, and then an opportunity to transmit data in the DL data portion 304. Following a guard period (GP) portion 306, the scheduling entity has an opportunity to receive an acknowledged (ACK)/not acknowledged (NACK) signal in the ACK/NACK portion 308 from other entities using the carrier. This frame structure is downlink-centric, as more resources are allocated for transmissions in the downlink direction (e.g., transmissions from the scheduling entity).

In one example, the control information portion 302 may be used to transmit a physical downlink control channel (PDCCH) and the DL data portion 304 may be used to transmit a data payload. Following the GP portion 306, the scheduling entity may receive an ACK signal (or a NACK signal) from the scheduled entity during the ACK/NACK portion 308 to indicate whether the data payload was successfully received. The GP portion 306 may be scheduled to accommodate variability in UL and DL timing. For example, latencies due to RF antenna direction switching (e.g., from DL to UL) and transmission path latencies may cause the scheduled entity to transmit early on the UL to match DL timing. Such early transmission may interfere with symbols received from the scheduling entity. Accordingly, the GP portion 306 may allow an amount of time after the DL data portion 304 to prevent interference, where the GP portion 306 may provide an appropriate amount of time for the scheduling entity to switch its RF antenna direction, for the over-the-air (OTA) transmission time, and time for ACK processing by the scheduled entity. Accordingly, the GP portion 306 may provide an appropriate amount of time for the scheduled entity to switch its RF antenna direction (e.g., from DL to UL), to processes the data payload, and for the over-the-air (OTA) transmission time. The duration of the GP portion 306 may be configured in terms of symbol periods. For example, the GP portion 306 may have a duration of one symbol period (e.g., 31.25 µs). This frame structure is downlink-centric, as more resources are allocated for transmissions in the downlink direction (e.g., transmissions from the scheduling entity).

In the UL-centric subframe 310, the scheduled entity first has an opportunity to receive control information in the control information portion 312. Following a GP portion 314, the scheduled entity has an opportunity to transmit data in the UL data portion 316. Following another GP portion 318, the scheduled entity subsequently has an opportunity to receive an ACK/NACK signal in the ACK/NACK portion 320 from the scheduling entity using the carrier. This frame structure is uplink-centric, as more resources are allocated for transmissions in the uplink direction (e.g., transmissions from the scheduled entity).

In an aspect, UL data processing at the scheduling entity may be amortized over the entire UL-centric subframe 310. The DL PDCCH portion 312, the ACK/NACK portion 320, and part of the GP portion 314 may all be used to decode UL data. The UL data may include multiple users and up to a high order of multi-user MIMO.

Figure 4:
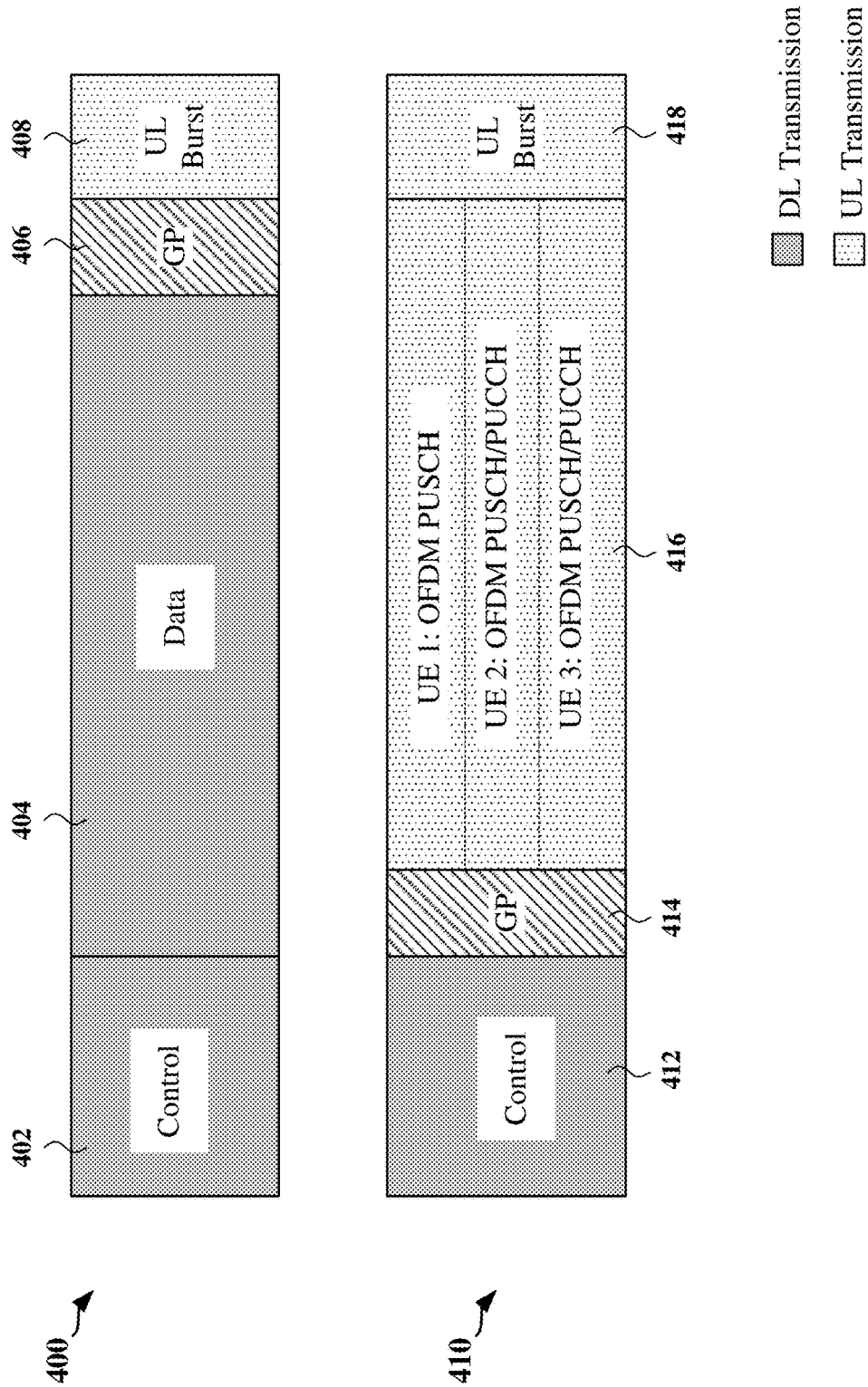
FIG. 4 is a diagram illustrating other exemplary structures of DL-centric and UL-centric subframes that may be used in some wireless communication networks.

FIG. 4 illustrates other exemplary structures of TDD next generation (5G) subframes that may be used in some wireless communication networks. For example, the exemplary structures shown in FIG. 4 may be used by scheduling entities serving small cells. A downlink-centric (DL-centric) subframe 400 may include a downlink control information portion 402, a downlink data portion 404 and an uplink control information portion 408 (common uplink burst). The downlink data portion 404 and uplink control information portion 408 may be separated by a guard period 406. Thus, the DL-centric subframe 400 may correspond to the DL-centric subframe 300, shown in FIG. 3.

An UL-centric subframe 410 may include a downlink control information portion 412, an uplink data portion 416 and an uplink control information portion 418 (common uplink burst). The downlink control information portion 412 may be separated from the uplink data portion 416 by a guard period 414. In some examples, the UL data portion 416 includes uplink data and/or uplink control information from multiple UEs multiplexed utilizing orthogonal frequency division multiplexing (OFDM). In the example shown in FIG. 4, the UL data portion 412 utilizes OFDM to carry UL data (PUSCH) from three UE's (UE 1, UE 2 and UE 3), along with UL control information (PUCCH) from UE 2 and UE 3.

The UL-centric subframe 410 is not entirely self-contained, as the DL acknowledgement information is not included within the same subframe as the uplink data. Thus, the UL-centric subframe 410 differs from the UL-centric subframe 310 shown in FIG. 3. However, by structuring the UL-centric subframe 410 to include the uplink control information portion 418, interference between DL-centric and UL-centric subframes 400 and 410 may be minimized. In particular, when frequency multiplexing the DL-centric and UL-centric subframes 400 and 410, there is no interference between the DL and UL control channels in the structures shown in FIG. 4.

Figure 5:
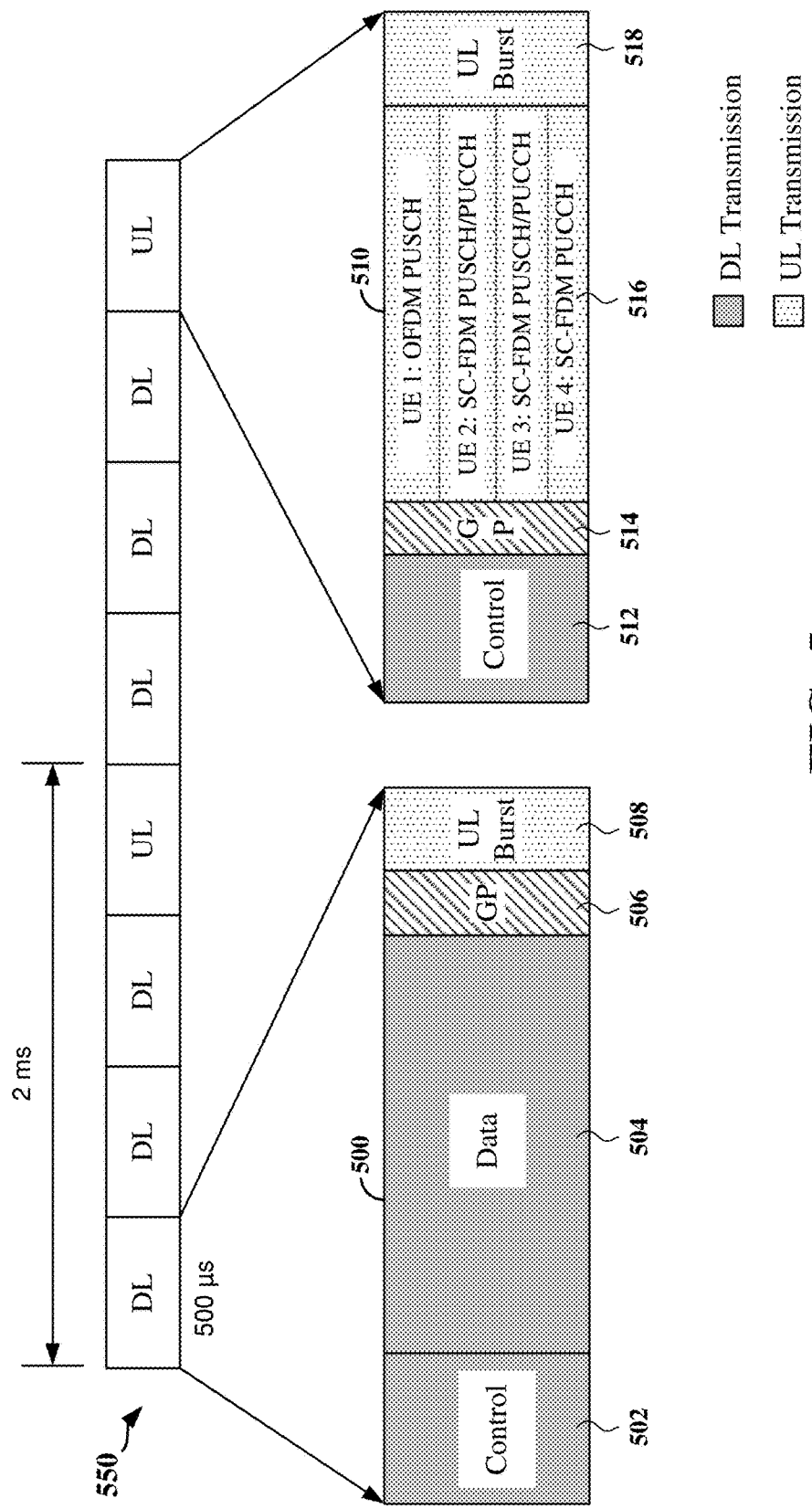
FIG. 5 is a diagram illustrating an exemplary sequence of DL-centric and UL-centric subframes that may be transmitted in some wireless communication networks.

Referring now to FIG. 5, UL-centric and DL-centric subframe structures similar to those shown in FIG. 4 may also be utilized in next generation macro cells, where UL-centric subframes 510 are time-multiplexed with DL-centric subframes 500. In the example shown in FIG. 5, each DL-centric subframe 500 includes a downlink control information portion 502, a downlink data portion 504 and an uplink control information portion 508 (common uplink burst). The downlink data portion 504 and uplink control information portion 508 may be separated by a guard period 506.

Each UL-centric subframe 510 includes a downlink control information portion 512, an uplink data portion 516 and an uplink control information portion 518 (common uplink burst). The downlink control information portion 512 may be separated from the uplink data portion 516 by a guard period 514. Instead of OFDM, uplink data and/or uplink control information may be multiplexed within the uplink data portion 516 of the UL-centric subframe 510 utilizing Single Carrier Frequency Division Multiplexing (SC-FDM) to provide for an improved link budget.

Each subframe may correspond to any suitable duration of time. In the example shown in FIG. 5, each subframe duration is 500 µs. In addition, any particular sequence 550 of UL-centric and DL-centric subframes may be used. In the example shown in FIG. 5, the sequence 550 includes three DL-centric subframes 500 followed by one UL-centric subframe 510. Thus, the duration of the sequence 550 shown in FIG. 5 is 2 ms, corresponding to four subframes (three DL-centric and one UL-centric).

Figure 6:
FIG. 6 is a table illustrating exemplary transmission direction sequence configurations for legacy wireless communication networks.

FIG. 6 is a table 600 illustrating exemplary transmission direction sequence configurations for legacy (e.g., 4G) wireless communication networks. Legacy (e.g., 4G) wireless communication networks, such as the LTE network, provide large downlink and uplink transmission durations to minimize switching due to the large guard period utilized in switching. For example, the table in FIG. 6 illustrates seven possible transmission direction sequence configurations for legacy subframes 0-9 within an LTE network. Each legacy subframe in a particular transmission direction sequence is either a downlink (D) subframe, an uplink (U) subframe or a special (S) subframe. D subframes include DL control and DL data information. U subframes include UL control and UL data information. S subframes include both DL information (control and/or data) and UL information (UL control). A guard period is also included in S subframes to enable switching from DL to UL. Each legacy subframe further has a duration of 1 ms.

Figure 7:
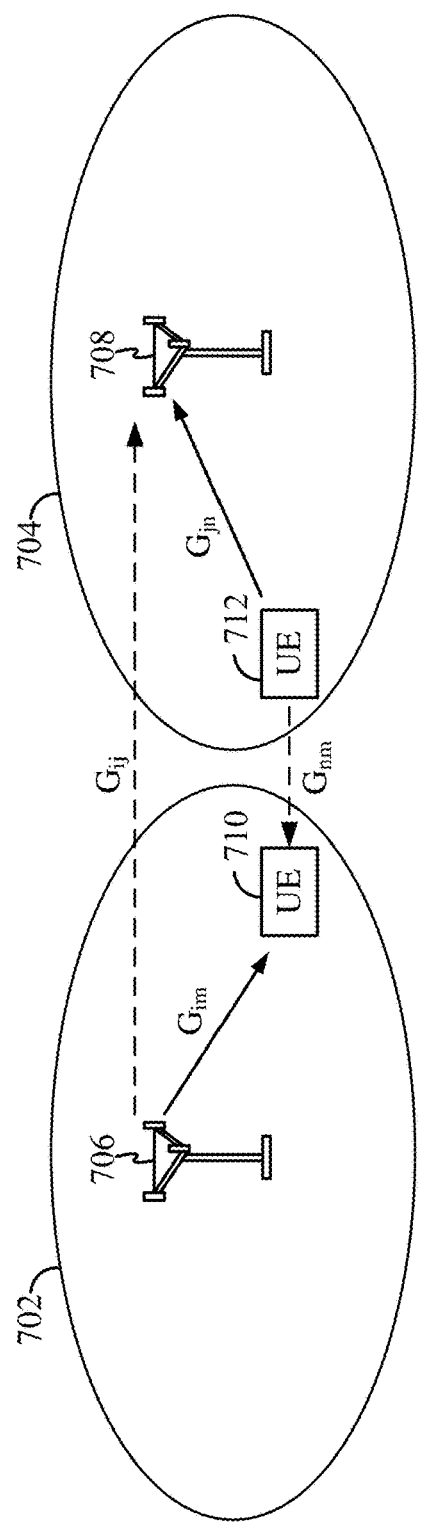
FIG. 7 is a diagram illustrating the coexistence of legacy and next generation wireless communication networks utilizing time division duplex (TDD) carriers according to some embodiments.

FIG. 7 is a diagram illustrating the coexistence of legacy and next generation (5G) wireless communication networks utilizing time division duplex (TDD) carriers. In the example shown in FIG. 7, a legacy cell 702 utilizing a legacy RAT is adjacent a next generation cell 704 utilizing a next generation RAT. The legacy cell 702 is served by a legacy scheduling entity 706, and the next generation cell 704 is served by a next generation scheduling entity 708. For example, a UE 710 within legacy cell 702 may communicate with the legacy scheduling entity 706, and a UE 712 within the next generation cell 704 may communicate with the next generation scheduling entity 708.

In some examples, the legacy scheduling entity 706 may utilize one of the transmission direction sequences shown, for example, in the table of FIG. 6 to communicate with a UE 710 within cell 702. If the next generation scheduling entity 708 utilizes the same frequency band as that used by the legacy scheduling entity 706 or an adjacent frequency band to that used by the legacy scheduling entity 706, mixed interference between downlink transmissions ($G_{lm}$) in the legacy cell 702 and uplink transmissions ($G_{jn}$) in the next generation cell 704 may occur. For example, UE 710 may experience interference ($G_{nm}$) from the uplink transmission ($G_{jn}$) in cell 708. In addition, the next generation scheduling entity 708 in next generation cell 704 may experience interference ($G_{nm}$) from the downlink transmission ($G_{jn}$) in legacy cell 702.

In various aspects of the disclosure, to mitigate the mixed interference between legacy and next generation cells, downlink and/or uplink transmissions may be aligned between the legacy and next generation cells 702 and 704. For example, the next generation scheduling entity 708 may utilize a configurable subframe structure to align downlink transmissions in the next generation cell 708 with downlink transmissions in the legacy cell 702 and/or uplink transmissions in the next generation cell 704 with uplink transmissions in the legacy cell 702. In various aspects of the disclosure, the configurable subframe structure may include at least one of a downlink portion or an uplink portion. The downlink portion may include only a downlink control portion or both a downlink control portion and a downlink data portion. In addition, the uplink portion may include only an uplink control portion or both an uplink control portion and an uplink data portion.

In various aspects of the disclosure, the next generation scheduling entity 712 may identify a subframe configuration of a legacy subframe to be transmitted in the legacy cell 702 and configure the configurable subframe structure to produce a next generation subframe for transmission in the next generation cell 704 substantially simultaneous to transmission of the legacy subframe in the legacy cell 702. For example, if the legacy subframe is a D subframe, the configured next generation subframe may include a downlink portion for transmission within a downlink transmit time of the legacy subframe (e.g., at substantially the same time as the legacy D subframe). In some examples, the configured next generation subframe may be transmitted within the same TTI as the legacy subframe. Similarly, if the legacy subframe is a U subframe, the configured next generation subframe may include an uplink portion for transmission within an uplink transmit time of the legacy subframe (e.g., at substantially the same time as the legacy U subframe). In other examples, if the legacy subframe is an S subframe, the configured next generation subframe may include both an uplink portion and a downlink portion, each corresponding to the respective uplink and downlink portions of the legacy subframe for transmission within the respective uplink and downlink transmission times of the legacy S subframe.

Figure 8:
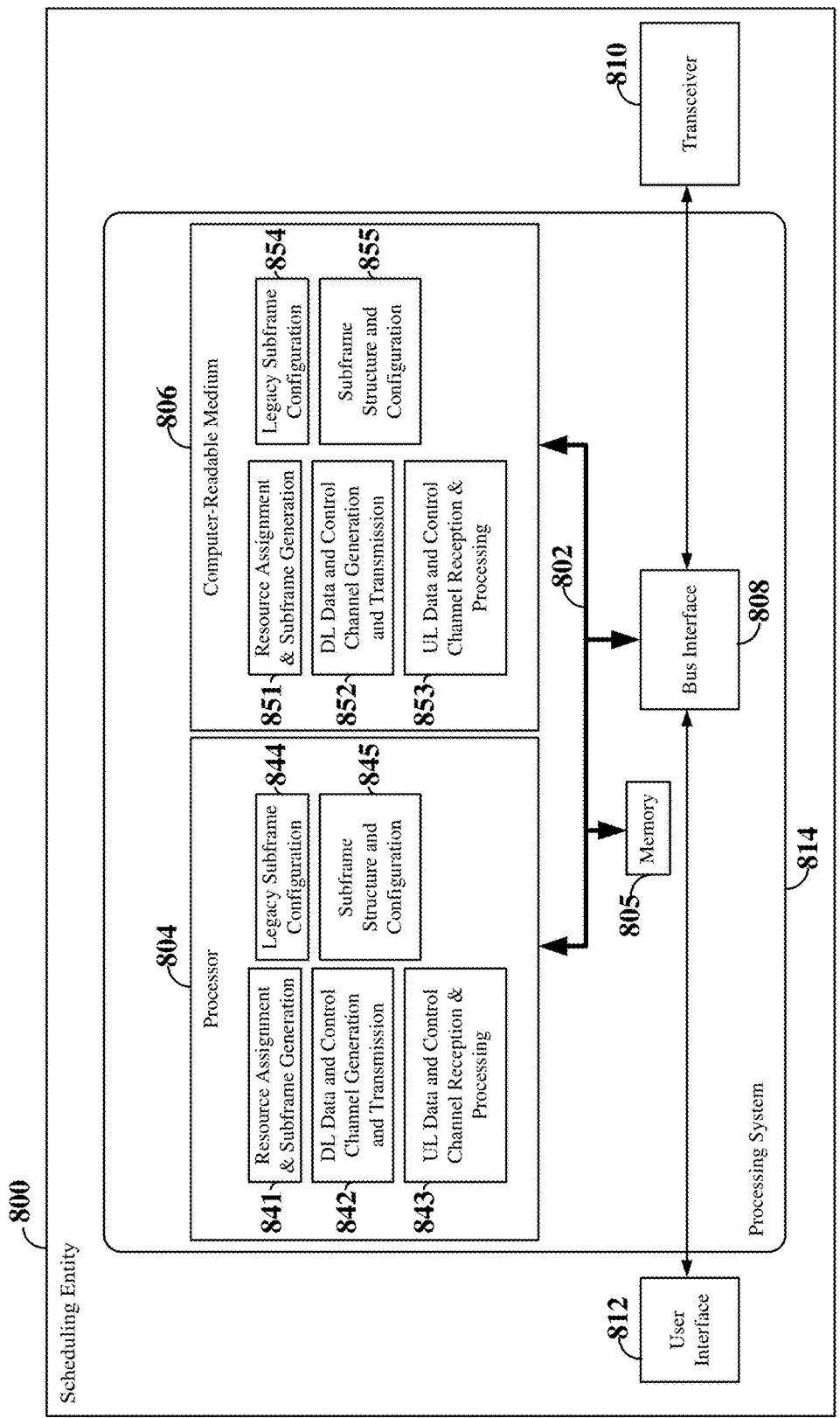
FIG. 8 is a block diagram illustrating an example of a hardware implementation for a scheduling entity employing a processing system according to some embodiments.

FIG. 8 is a conceptual diagram illustrating an example of a hardware implementation for an exemplary scheduling entity 800 employing a processing system 814. For example, the scheduling entity 800 may be a user equipment (UE) as illustrated in any one or more of FIGS. 1 and/or 2. In another example, the scheduling entity 800 may be a base station as illustrated in any one or more of FIGS. 1 and/or 2. The scheduling entity 800 may be a next generation (5G) scheduling entity serving a macro or small cell. The next generation scheduling entity 800 may be positioned in the next generation (5G) wireless communication network in close proximity to one or more neighboring legacy (3G or 4G) scheduling entities in a legacy (3G or 4G) wireless communication network. The neighboring legacy scheduling entities may operate on the same frequency band as the scheduling entity 800 or an adjacent frequency band. As such, the scheduling entity 800 may operate to minimize mixed interference between uplink and downlink transmissions in the legacy and next generation networks.

The scheduling entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be used to implement any one or more of the processes described below.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a means for communicating with various other apparatus over a transmission medium. Depending upon the nature of the apparatus, a user interface 812 (e.g., keypad, display, speaker, microphone, joystick) may also be provided.

The processor 804 is responsible for managing the bus 302 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

In some aspects of the disclosure, the processor 804 may include circuitry configured for various functions. For example, the processor 804 may include resource assignment and subframe generation circuitry 841, configured to generate, schedule, and modify a resource assignment or grant of time-frequency resources. For example, the resource assignment and subframe control circuitry 841 may generate one or more time division duplex (TDD) subframes, each including time-frequency resources assigned to carry data and/or control information to and/or from multiple subordinate entities. The resource assignment and subframe generation circuitry 841 may operate in coordination with resource assignment and subframe generation software 851.

The processor 804 may further include downlink (DL) data and control channel generation and transmission circuitry 842, configured to generate and transmit downlink data and control channels. The DL data and control channel generation and transmission circuitry 842 may operate in coordination with the resource assignment and subframe control circuitry 841 to schedule the DL data and/or control information and to place the DL data and/or control information onto a time division duplex (TDD) carrier within one or more subframes generated by the resource assignment and subframe generation circuitry 841 in accordance with the resources assigned to the DL data and/or control information. The DL data and control channel generation and transmission circuitry 842 may further operate in coordination with DL data and control channel generation and transmission software 852.

The processor 804 may further include uplink (UL) data and control channel reception and processing circuitry 843, configured to receive and process uplink control channels and uplink data channels from one or more subordinate entities. In some examples, the UL data and control channel reception and processing circuitry 843 may be configured to receive scheduling requests from one or more subordinate entities, the scheduling requests being configured to request a grant of time-frequency resources for uplink user data transmissions. In other examples, the UL data and control channel reception and processing circuitry 843 may be configured to receive and process acknowledgement information (e.g., acknowledged/not acknowledged packets) from one or more subordinate entities. The UL data and control channel reception and processing circuitry 843 may operate in coordination with the resource assignment and subframe generation circuitry 841 to schedule UL data transmissions, DL data transmissions and/or DL data retransmissions in accordance with the received UL control channel information. The UL data and control channel reception and processing circuitry 843 may further operate in coordination with UL data and control channel reception and processing software 853.

The processor 804 may further include legacy subframe configuration circuitry 844, configured to identify legacy subframe configuration information indicating a legacy subframe configuration for one or more legacy subframes in a legacy (3G or 4G) wireless communication network. In some examples, the legacy subframe circuitry 844 may communicate with one or more neighboring legacy scheduling entities (i.e., eNBs) over the X2 interface to receive the legacy subframe configuration information. In other examples, the legacy subframe configuration circuitry 844 may receive a control channel broadcast from a neighboring legacy scheduling entity and process the control channel to determine the legacy subframe configuration information. In still other examples, the legacy subframe configuration circuitry 844 may receive the legacy subframe configuration information from one or more subordinate entities in wireless communication with the scheduling entity 800. For example, a scheduled entity may receive a broadcast control channel from a neighboring scheduling entity, process the broadcast control channel to determine the legacy subframe configuration information and transmit the legacy subframe configuration information to the scheduling entity (e.g., in response to a request for the legacy subframe configuration information from the scheduling entity). The received legacy subframe configuration information may be stored, for example, in memory 805.

The legacy subframe configuration information indicates a particular legacy subframe configuration of one or more legacy subframes. For example, the legacy subframe configuration of a legacy subframe may include a downlink portion (e.g., downlink control and/or downlink data) and/or an uplink portion (e.g., uplink control and/or uplink data). In some examples, the legacy subframe configuration information may indicate whether a particular legacy subframe to be transmitted in the legacy network is a downlink subframe (e.g., a subframe that includes downlink control and downlink data), an uplink subframe (e.g., a subframe that includes uplink control and uplink data) or a special subframe (e.g., a subframe that includes both downlink data and uplink control). As indicated above, a special subframe may be utilized by the legacy network, for example, in downlink-to-uplink switching, and may provide a gap (guard period) between downlink transmissions and uplink transmissions within the special subframe. The uplink control information included in special subframes may include, for example, an uplink pilot time slot. In addition, uplink acknowledgement information in legacy subframes may be transmitted in uplink subframes, not in special subframes. If the legacy network provides multiple configurations for special subframes (e.g., different guard periods), the legacy subframe configuration information may further indicate the particular configuration used for a special subframe.

In another example, the legacy subframe configuration information may indicate a transmission direction sequence of a plurality of legacy subframes (i.e., a sequence of uplink, downlink and special subframes). For example, the legacy network may support multiple legacy subframe transmission direction sequences (e.g., as shown in FIG. 6), and the legacy subframe configuration information may indicate a particular transmission direction sequence to be utilized by the legacy network for the next N legacy subframes. The transmission direction sequence may be static in the legacy network or may vary dynamically. If the transmission direction sequence varies in the legacy network, the legacy subframe configuration circuity 844 may receive periodic updates from the legacy wireless communication network with the current transmission direction sequence. The legacy subframe configuration circuitry 844 may further operate in coordination with legacy subframe configuration software 854.

The processor 804 may further include subframe structure and configuration circuitry 845, configured to provide a configurable next generation (5G) subframe structure to minimize mixed interference between uplink and downlink transmissions in the legacy and next generation networks. The configurable next generation subframe structure includes a downlink portion (e.g., downlink control and/or downlink data) and an uplink portion (e.g., uplink control and/or uplink data). The subframe structure and configuration circuitry 845 may configure the configurable next generation subframe structure to produce a next generation subframe based on the legacy subframe configuration. For example, the subframe structure and configuration circuitry 845 may operate in coordination with the legacy subframe configuration circuitry 844 to determine the legacy subframe configuration of a legacy subframe to be transmitted, and configure the next generation subframe to substantially align the uplink and/or downlink portions in time between the legacy subframe and the next generation subframe.

The subframe structure and configuration circuitry 845 may further operate in coordination with the resource assignment and subframe generation circuitry 841 to generate the next generation subframe in accordance with the configured subframe structure and to assign resources to the next generation subframe. In addition, the subframe structure and configuration circuitry 845 may further operate in coordination with the DL data and control channel generation and transmission circuitry 842 to provide the configured subframe structure for the next generation subframe to one or more subordinate entities.

In some examples, the subframe structure and configuration circuitry 845 may determine that the legacy subframe is a downlink (D) subframe, and configure the next generation subframe to include downlink information (e.g., downlink control and/or downlink data). In another example, the subframe structure and configuration circuitry 845 may determine that the legacy subframe is an uplink (U) subframe, and configure the next generation subframe to include uplink information (e.g., uplink control and/or uplink data). In another example, the subframe structure and configuration circuitry 845 may determine that the legacy subframe is a special (S) subframe, and configure the next generation subframe to substantially align downlink and uplink portions of the legacy special subframe with downlink and uplink portions in the next generation subframe.

In some examples, each legacy subframe may correspond to a transmission time interval (TTI). In this example, the subframe structure and configuration circuitry 345 may further determine the TTI of the legacy subframe, and configure the next generation subframe to have a duration equal to the TTI of the legacy subframe. In other examples, the subframe structure and configuration circuitry 345 may determine the transmission direction sequence of the next N legacy subframes, and configure the next generation subframe in accordance with the transmission direction sequence. In this example, the duration of the next generation subframe may be equal to the sum of the duration of the N legacy subframes.

In some examples, the subframe structure and configuration circuitry 845 may determine that the legacy subframe is a downlink (D) subframe, and configure the next generation subframe to include both downlink information (e.g., downlink control and/or downlink data) and uplink control information, which may include, for example, acknowledgement information. In this example, the uplink control information may be transmitted by the subordinate entities within a narrow frequency band of an in-band frequency range over which the next generation subframe is transmitted to minimize mixed interference between legacy and next generation downlink/uplink transmissions. In another example, the uplink control information may be transmitted by the subordinate entities over a secondary component TDD carrier separated by a guard frequency band from a primary component TDD carrier on which the downlink information is transmitted to minimize the mixed interference. In another example, the uplink control information may be transmitted by the subordinate entities at a power lower than the power configured for a regular uplink transmission that is aligned with an uplink portion of a legacy subframe to minimize the mixed interference. The subframe structure and configuration circuitry 845 may further operate in coordination with subframe structure and configuration software 855.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 9:
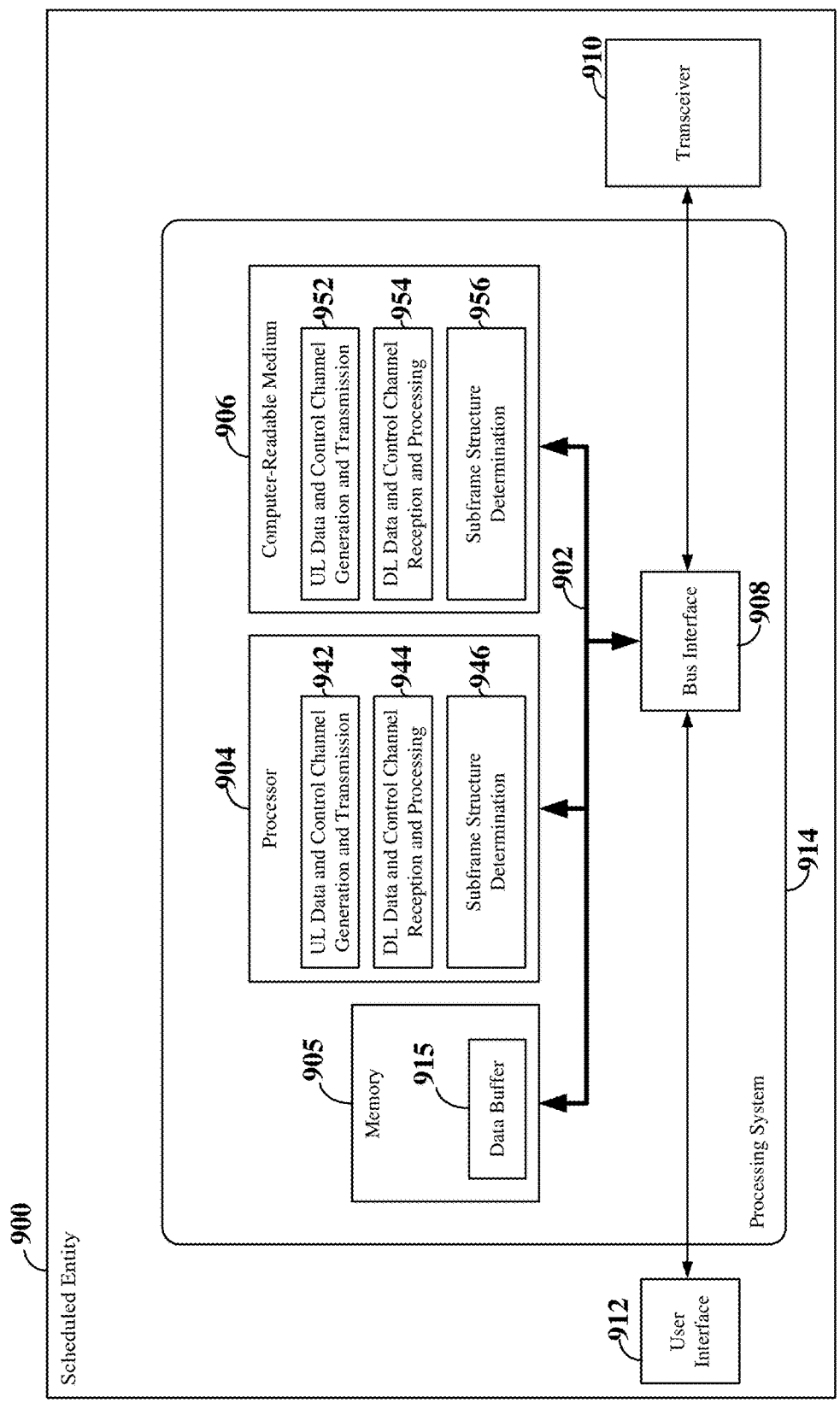
FIG. 9 is a block diagram illustrating an example of a hardware implementation for a scheduled entity employing a processing system according to some embodiments.

FIG. 9 is a conceptual diagram illustrating an example of a hardware implementation for an exemplary scheduled entity 900 employing a processing system 914. In accordance with various aspects of the disclosure, an element, or any portion of an element, or any combination of elements may be implemented with a processing system 914 that includes one or more processors 904. For example, the scheduled entity 900 may be a user equipment (UE) as illustrated in any one or more of FIGS. 1 and/or 2.

The processing system 914 may be substantially the same as the processing system 914 illustrated in FIG. 8, including a bus interface 908, a bus 902, memory 905, a processor 904, and a computer-readable medium 906. Furthermore, the scheduled entity 900 may include a user interface 912 and a transceiver 910 substantially similar to those described above in FIG. 8. That is, the processor 904, as utilized in a scheduled entity 900, may be used to implement any one or more of the processes described below.

In some aspects of the disclosure, the processor 904 may include uplink (UL) data and control channel generation and transmission circuitry 942, configured to generate and transmit uplink data on an UL data channel, and to generate and transmit uplink control/feedback/acknowledgement information on an UL control channel. The UL data and control channel generation and transmission circuitry 942 may operate in coordination with UL data and control channel generation and transmission software 952. The processor 904 may further include downlink (DL) data and control channel reception and processing circuitry 944, configured for receiving and processing downlink data on a data channel, and to receive and process control information on one or more downlink control channels. In some examples, received downlink data and/or control information may be temporarily stored in a data buffer 915 within memory 905. The DL data and control channel reception and processing circuitry 944 may operate in coordination with DL data and control channel reception and processing software 954.

The processor 904 may further include subframe structure determination circuitry 946, configured to determine a subframe structure designated by the scheduling entity for one or more next generation subframes. For example, the scheduling entity may transmit subframe structure information indicating the scheduled time/frequency resources designated for UL control, UL data, DL control and/or DL data for one or more next generation subframes to the scheduled entity. The subframe structure information may be received by the DL data and control channel reception and processing circuitry 944 and communicated to the subframe structure determination circuitry 946 to determine the structure of one or more next generation subframes in accordance with the scheduled UL/DL resources. The subframe structure determination circuitry 946 may further provide the subframe structure information to the UL data and control channel generation and transmission circuitry 942 to enable generation and transmission of uplink control and data information in one or more next generation subframes in accordance with the designated scheduled resources.

In some examples, the subframe structure information for one or more next generation subframes may be transmitted within a message sent from the scheduling entity to the subordinate entities. The message may be, for example, a Radio Resource Control (RRC) message or other L2 or L3 message. In another aspect of the disclosure, the subframe structure information may be transmitted within a downlink control portion (for example, in the Downlink Control Information (DCI)) of a subframe sent prior to the one or more subframes to which the subframe structure information applies. The subframe structure determination circuitry 946 may operate in coordination with the subframe structure determination software 956.

Figure 10:
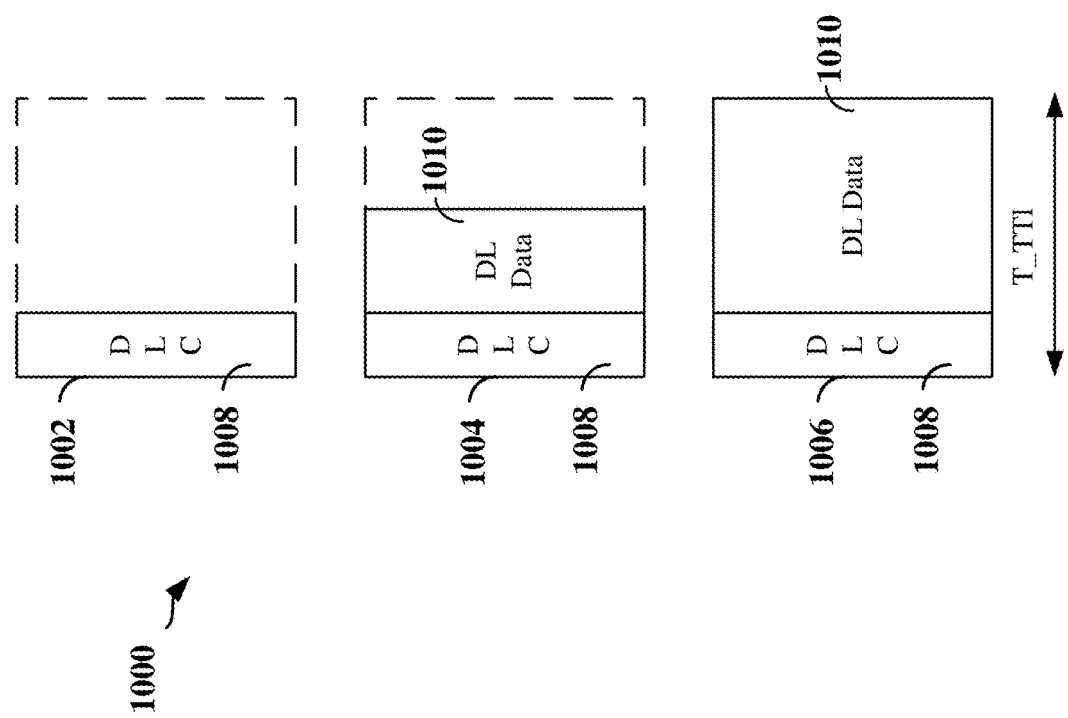
FIG. 10 is a diagram illustrating exemplary downlink transmission time interval (TTI) structures for use in configuring the structure of one or more next generation subframes according to some embodiments.

FIG. 10 illustrates exemplary downlink transmission time interval (DL TTI) structures 1000 for use in configuring the structure of one or more next generation subframes. The DL TTI structures 1000 shown in FIG. 10 are examples of basic building blocks for DL portions of next generation subframes. Each DL TTI structure 1000 includes a set of N symbols. The N symbols may be of the same length or different lengths. Each DL TTI structure duration (T_TTI) is scalable and the number (N) of symbols within a DL TTI structure may be set based on the DL TTI structure duration. For example, each DL TTI structure may include 2, 4, 8, 16, 32, 64, or other compliment, OFDM symbols.

Each DL TTI structure 1000 may include one or more of a DL control portion 1008 or a DL data portion 1010. In some examples, the DL control portion 1008 may include one or two symbols, while the number of symbols in the DL data portion 1010 may be equal to the difference between the total number (N) of symbols in the TTI structure 1000 and the number of symbols in the DL control portion.

In FIG. 10, three types of DL TTI structures 1002, 1004 and 1006 are illustrated. A first DL TTI type 1002, referred to herein as DL TTI Type 0, includes only the DL control portion (DL common burst) 1008, which may include, for example, 1-2 symbols. A second DL TTI type 1004, referred to herein as DL TTI Type 1, includes the DL common burst 1008 and a partial DL data portion 1010. A third DL TTI type 1006, referred to herein as DL TTI Type 2, includes the DL common burst 1008 and a full DL data portion 1010. Thus, DL TTI Type 2 includes more symbols in the DL data portion 1010 than the DL TTI Type 1. It should be understood that the DL TTI structures 1000 illustrated are in FIG. 10 are merely exemplary, and the present disclosure is not limited to the particular structures shown in FIG. 10.

In some examples, downlink control information (DCI) may be included in both the DL common burst 1008 and the DL data portion 1010. However, including the DCI in the DL data portion 1010 may be less reliable than sending the DCI in the DL common burst 1008. In addition to DCI, the DL common burst 1008 may also carry CSI-RS (Channel State Information-Reference Signal). For multi-user scheduling, DL split symbol control may be used to provide for multi-user ACK/NACK.

Figure 11:
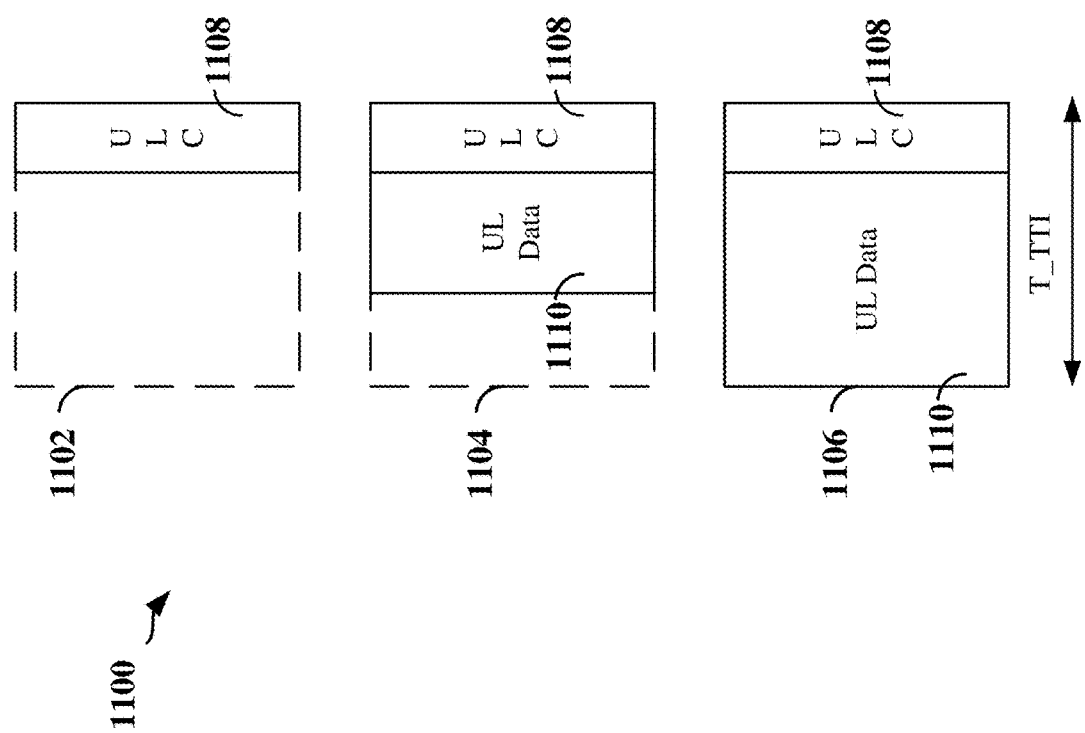
FIG. 11 is a diagram illustrating exemplary uplink transmission time interval (TTI) structures for use in configuring the structure of one or more next generation subframes according to some embodiments.

FIG. 11 illustrates exemplary uplink transmission time interval (UL TTI) structures 1100 for use in configuring the structure of one or more next generation subframes. The UL TTI structures 1100 shown in FIG. 11 are examples of basic building blocks for UL portions of next generation subframes. Each UL TTI structure 1100 includes a set of N symbols. The N symbols may be of the same length or different lengths. Each UL TTI structure duration (T_TTI) is scalable and the number (N) of symbols within an UL TTI structure may be set based on the UL TTI structure duration. For example, each UL TTI structure may include 4, 8, 16, 32, 64, or other compliment, OFDM symbols.

Each UL TTI structure 1100 may include one or more of an UL control portion 1108 or an UL data portion 1110. In some examples, the UL control portion 1108 may include one or two symbols, while the number of symbols in the UL data portion 1110 may be equal to the difference between the total number (N) of symbols in the TTI structure 1100 and the number of symbols in the UL control portion.

In FIG. 11, three types of UL TTI structures are illustrated 1102, 1104, and 1106. A first UL TTI type 1102, referred to herein as DL TTI Type 0, includes only the UL control block (UL common burst) 1108, which may include, for example, 1-2 symbols. A second UL TTI type 1104, referred to herein as UL TTI Type 1, includes the UL common burst 1108 and a partial UL data portion 1110. A third UL TTI type 1106, referred to herein as UL TTI Type 2, includes the UL common burst 1108 and a full UL data portion 1110. Thus, UL TTI Type 2 includes more symbols in the UL data portion 1110 than the UL TTI Type 1. It should be understood that the UL TTI structures 1100 illustrated are in FIG. 11 are merely exemplary, and the present disclosure is not limited to the particular structures shown in FIG. 11.

In some examples, uplink control information (UCI) may be included in both the UL common burst 1108 and the UL data portion 1110. However, including the UCI in the UL data portion 1110 may be less reliable than sending the UCI in the UL common burst 1108. In addition to UCI, the UL common burst 1108 may also carry low latency data. For multiple UEs, UL control split symbols may be used for acknowledgement.

Figure 12:
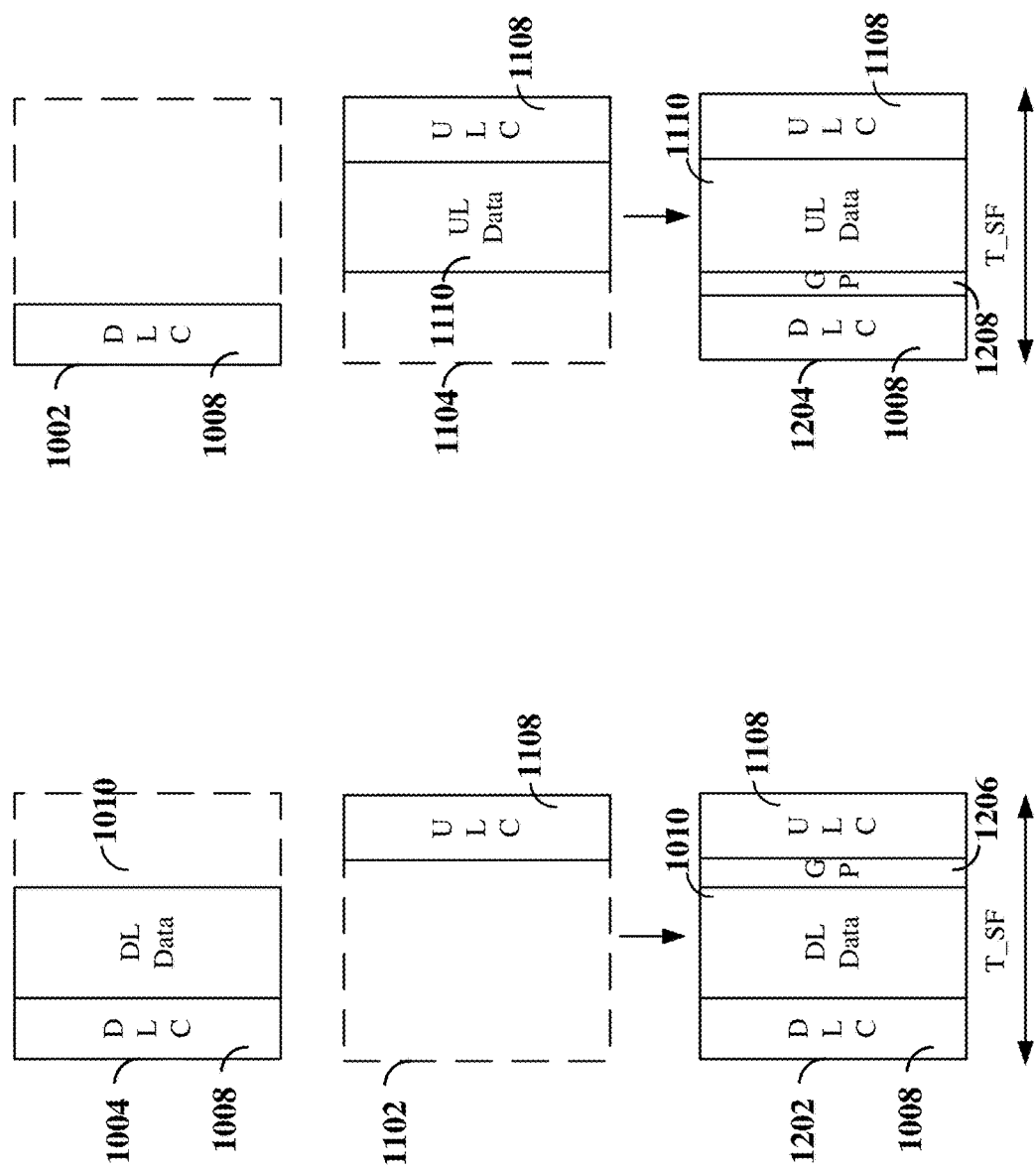
FIG. 12 is a diagram illustrating exemplary next generation subframes configured using the DL/UL TTI structures according to some embodiments.

FIG. 12 is a diagram illustrating exemplary next generation subframes 1202 and 1204 configured using the DL/UL TTI structures 1000 and 1100 shown in FIGS. 10 and 11. In the example shown in FIG. 12, subframe 1202 may be configured using the first UL TTI type structure 1102 (e.g., UL TTI Type 0) and the second DL TTI type structure 1004 (e.g., DL TTI Type 1). The combination of the UL TTI Type 0 structure and the DL TTI Type 1 structure forms a DL-centric subframe 1202, similar to the DL-centric subframes shown in FIGS. 3-5. Thus, the DL-centric subframe 1202 includes a DL control portion 1008, a partial DL data portion 1010, an UL control portion 1108 and a guard period separating the partial DL data portion 1010 and the UL control portion 1108. In some examples, the number of DL control OFDM symbols may be 2, the number of DL data OFDM symbols may be 12 and the number of UL control OFDM symbols may be 1.

Subframe 1204 may be configured using the first DL TTI type structure 1002 (e.g., DL TTI Type 0) and the second UL TTI type structure 1104 (e.g., UL TTI Type 1). The combination of the DL TTI Type 0 structure and the UL TTI Type 1 structure forms an UL-centric subframe 1204, similar to the UL-centric subframes shown in FIGS. 4 and 5. Thus, the UL-centric subframe 1204 includes a DL control portion 1008, a partial UL data portion 1110, an UL control portion 1108 and a guard period separating the DL control portion 1008 and the partial UL data portion 1110. In some examples, the number of DL control OFDM symbols may be 2, the number of UL data OFDM symbols may be 12 and the number of UL control OFDM symbols may be 1.

The subframe duration (T_SF) of the next generation subframes 1202 and 1204 may be determined from the TTI structure duration (T_TTI). In some examples, the subframe duration T_SF may be equal to the TTI structure duration (T_TTI). For example, with 16 OFDM symbols per subframe, each having a duration of 31.25 µs, the subframe duration T_SF is approximately equal to 500 ms.

Figure 13:
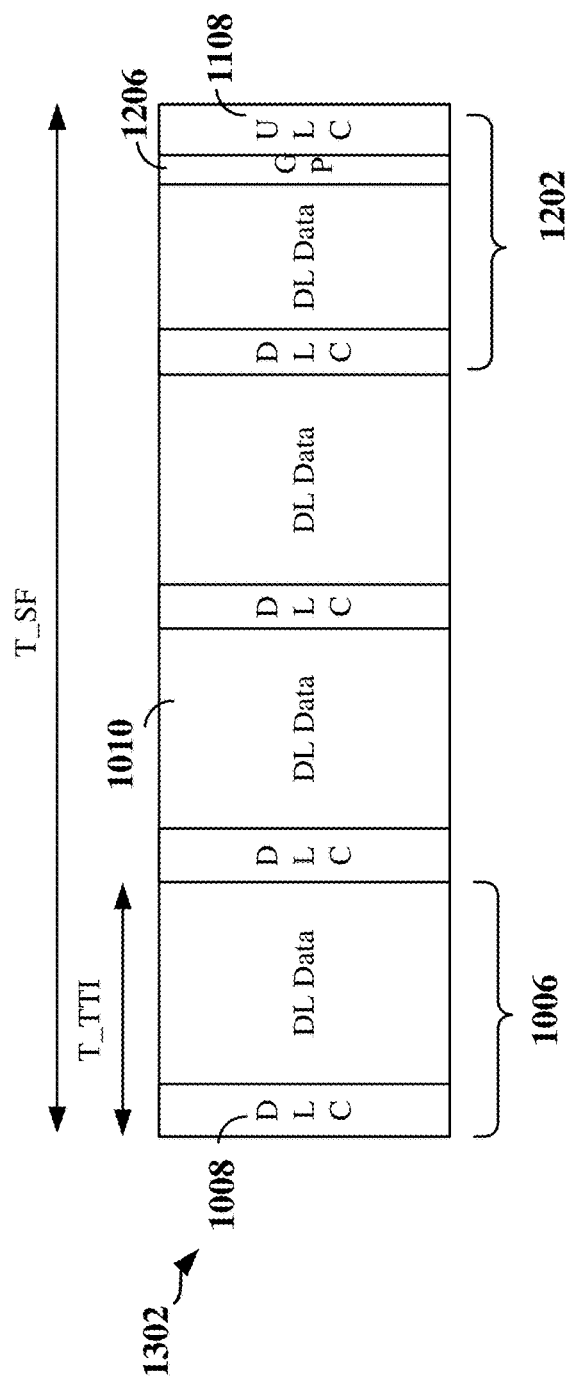
FIG. 13 is a diagram illustrating other exemplary next generation subframes configured using the DL/UL TTI structures according to some embodiments.

FIG. 13 illustrates another example of a next generation subframe 1302 configured using the DL/UL TTI structures 1000 and 1100 shown in FIGS. 10 and 11. In the example shown in FIG. 13, the next generation subframe 1302 is a multi-TTI subframe, which includes multiple TTI structures and has a subframe duration (T_SF) greater than a single TTI structure duration (T_TTI). In general, a multi-TTI subframe 1302 may include more than one DL TTI structure and/or more than one UL TTI structure and may have a subframe duration (T_SF) greater than or equal to twice the single TTI structure duration (T_TTI). For example, if each TTI structure includes eight 01-DM symbols and the duration of each OFDM symbol if 3.9 µs, the subframe duration (T_SF) of a multi-TTI structure including four TTI structures is approximately equal to 250 µs.

The multi-TTI structure 1302 shown in FIG. 13 is configured using multiple DL TTI Type 2 structures 1006, each including a DL control portion 1008 and a DL data portion 1010. In addition, the multi-TTI subframe 1302 shown in FIG. 13 further includes a DL TTI Type 1 structure and an UL TTI Type 0 structure. The DL TTI 1 structure and the UL TTI Type 0 structure collectively form a structure corresponding to the DL-centric subframe 1202 shown in FIG. 12. In some examples, the next generation subframe 1302 shown in FIG. 13 may be utilized to align with all or part of a sequence of legacy subframes. In some examples, the multi-TTI subframe structure may be utilized in millimeter wave applications.

Figure 14:
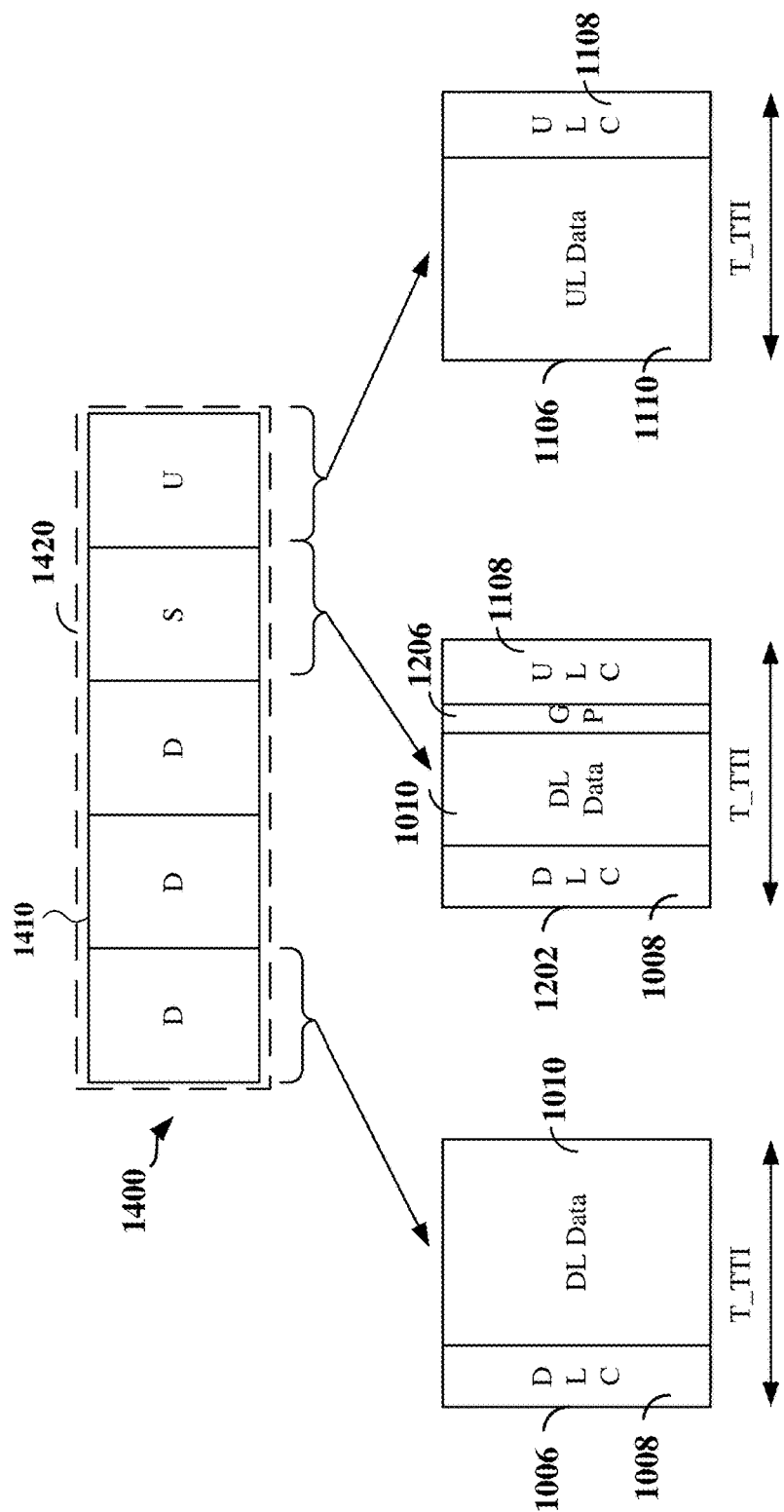
FIG. 14 is a diagram illustrating an exemplary alignment of uplink and downlink transmissions between legacy and next generation wireless communication networks according to some embodiments.

FIG. 14 is a diagram illustrating an exemplary alignment of uplink and downlink transmissions between legacy and next generation wireless communication networks. FIG. 14 illustrates a legacy transmission direction sequence 1400 of subframes 1410 for a legacy cell. The legacy transmission sequence shown in FIG. 14 corresponds to legacy subframe configuration #2 in the table shown in FIG. 6. It should be understood that the legacy transmission direction sequence shown in FIG. 14 is merely an example legacy subframe configuration and a similar approach as that shown in FIG. 14 may be applied to any of the legacy subframe configurations shown in FIG. 6.

To align the uplink and downlink transmissions in the legacy cell with uplink and downlink transmissions in a next generation cell, a multi-TTI (or extended) next generation subframe 1420 (indicated by the dotted line) may be configured to correspond to a collection of sequential legacy subframes 1410. Thus, the multi-TTI next generation subframe 1420 may be configured as a plurality of DL/UL TTI structures corresponding to the D, S and U subframes in the collection of legacy subframes 1410.

For example, the next generation subframe 1420 may include a DL TTI Type 2 structure 1006 for one or more of the D legacy subframes, an UL TTI Type 2 structure 1106 for the U legacy subframe and a combination of DL/UL TTIs (e.g., Type 0 and 1) for the S subframe. In some examples, the next generation subframe may include a DL TTI Type 2 structure 1006 for the first D legacy subframe and a DL TTI structure that includes only data (no control portion) for each of the second and third D legacy subframes. For the S legacy subframe, in the example shown in FIG. 14, the next generation subframe 1420 includes a DL TTI Type 1 structure and an UL TTI Type 0 structure that collectively form a structure corresponding to the DL-centric subframe 1202 shown in FIG. 12. In other examples, for the S legacy subframe, the next generation subframe 1420 may include a DL TTI structure that includes only data (no control portion) together with the UL TTI Type 0 structure. The resulting multi-TTI next generation subframe 1420 may be a self-contained subframe, similar to the self-contained subframes shown in FIG. 3, depending on the transmission direction sequence of the collection of legacy subframes 1410 corresponding to the next generation subframe 1420.

By configuring the next generation subframe 1402 as shown in FIG. 14, during transmission of the next generation subframe 1402, the DL portions (e.g., the DL control portions 1008 and DL data portions 1010 of the DL TTI Type 2 structures 1006 and the DL TTI Type 1 structure) may be transmitted within downlink transmit times of D and S legacy subframes 1410. In addition, the UL portions (e.g., the UL control portions 1108 and UL data portions 1110 within the UL TTI Type 2 structure 1106 and the UL TTI Type 0 structure) may be transmitted within uplink transmit times of S and U legacy subframes 1410. As a result, interference may be minimized between the legacy and next generation transmissions.

In some examples, as shown in FIG. 14, the duration (T_TTI) of each next generation TTI structure may be equal to the duration of each legacy subframe 1410. However, in other examples, if the duration of a next generation TTI structure is less than the duration of a legacy subframe, multiple next generation TTI structures (DL and/or UL) may be used to substantially align the next generation subframe configuration with the legacy subframe configuration. For example, if an integer number of DL TTI structures do not exactly match the length of a D legacy subframe 1410, the next generation subframe 1420 may include as many back-to-back DL TTI structures of Type 2 as possible without exceeding the length of the D legacy subframe 1410.

Figure 15:
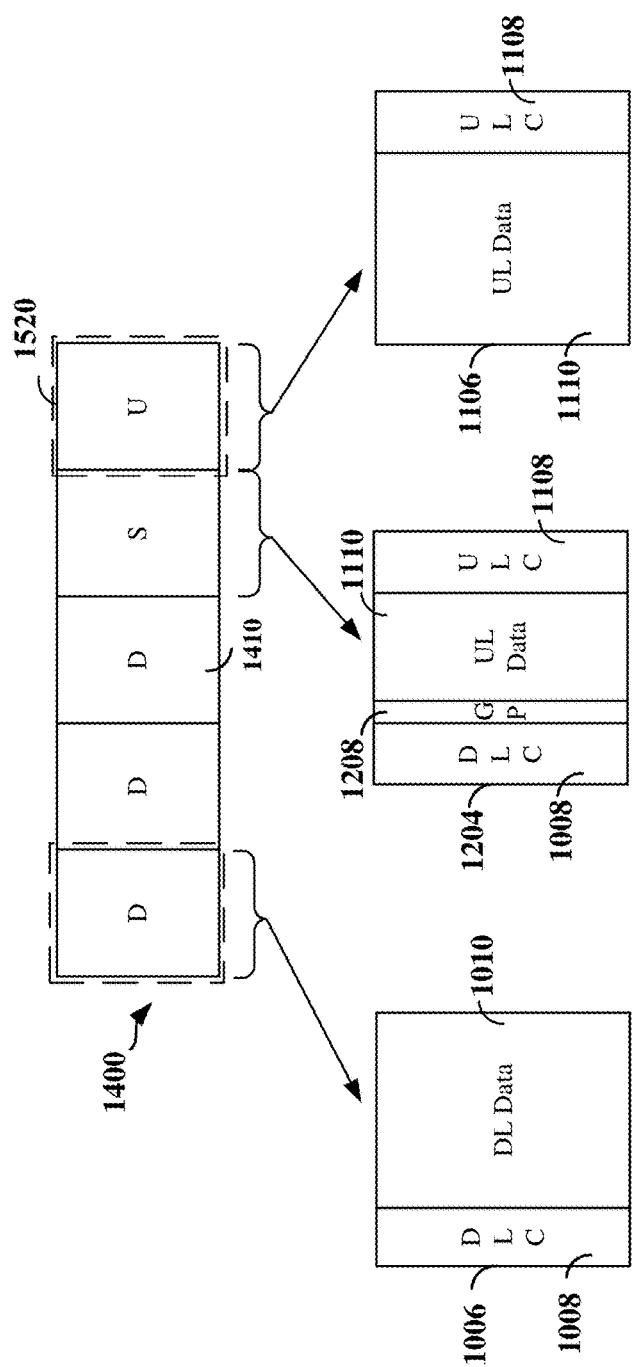
FIG. 15 is a diagram illustrating another exemplary alignment of uplink and downlink transmissions between legacy and next generation wireless communication networks.

FIG. 15 is a diagram illustrating another exemplary alignment of uplink and downlink transmissions between legacy and next generation wireless communication networks. FIG. 15 illustrates the same legacy transmission direction sequence 1400 of subframes 1410 as shown in FIG. 14 (e.g., corresponding to legacy subframe configuration #2 in the table shown in FIG. 6). However, it should be understood that the legacy transmission direction sequence shown in FIG. 15 is merely an example legacy subframe configuration and a similar approach as that shown in FIG. 15 may be applied to any of the legacy subframe configurations shown in FIG. 6.

In FIG. 15, each next generation subframe 1520 (illustrated by the dashed lines) corresponds to one legacy subframe 1410. Thus, the duration (T_TTI) of each next generation subframe 1520 may be equal to the duration of each legacy subframe 1410. For example, each next generation subframe 1520 may have a duration of 1 ms, corresponding to the legacy subframe duration.

In the example shown in FIG. 15, a DL TTI Type 2 structure 1006 is provided for each D legacy subframe, an UL TTI Type 2 structure 1106 is provided for each U legacy subframe, and a combination of DL/UL TTIs (Type 0 or 1) is provided for S legacy subframes. For example, the next generation subframe 1520 corresponding to the S legacy subframe may include a DL TTI Type 0 structure and an UL TTI Type 1 structure that collectively form a structure corresponding to the UL-centric subframe 1204 shown in FIG. 12. Thus, the next generation subframe 1520 corresponding to the S subframe may be a self-contained subframe, similar to the self-contained subframes shown in FIG. 3. Since the next generation subframes 1520 corresponding to U legacy subframes 1410 may not contain DL control information, the downlink control information (DCI) in next generation subframes corresponding to D or S legacy subframes 1410 may include control information for that subframe and any subsequent U frames that immediately follow.

During transmission of the sequence of next generation subframes 1502, DL portions (e.g., the DL control portions 1008 and DL data portions 1010 of the DL TTI Type 2 structures 1006 and the DL TTI Type 0 structure) may be transmitted within downlink transmit times of D and S legacy subframes 1410. In addition, UL portions (e.g., the UL control portions 1108 and UL data portions 1110 within the UL TTI Type 2 structure 1106 and the UL TTI Type 1 structure) may be transmitted within uplink transmit times of S and U legacy subframes 1410. As a result, interference may be minimized between the legacy and next generation transmissions.

Figure 16:
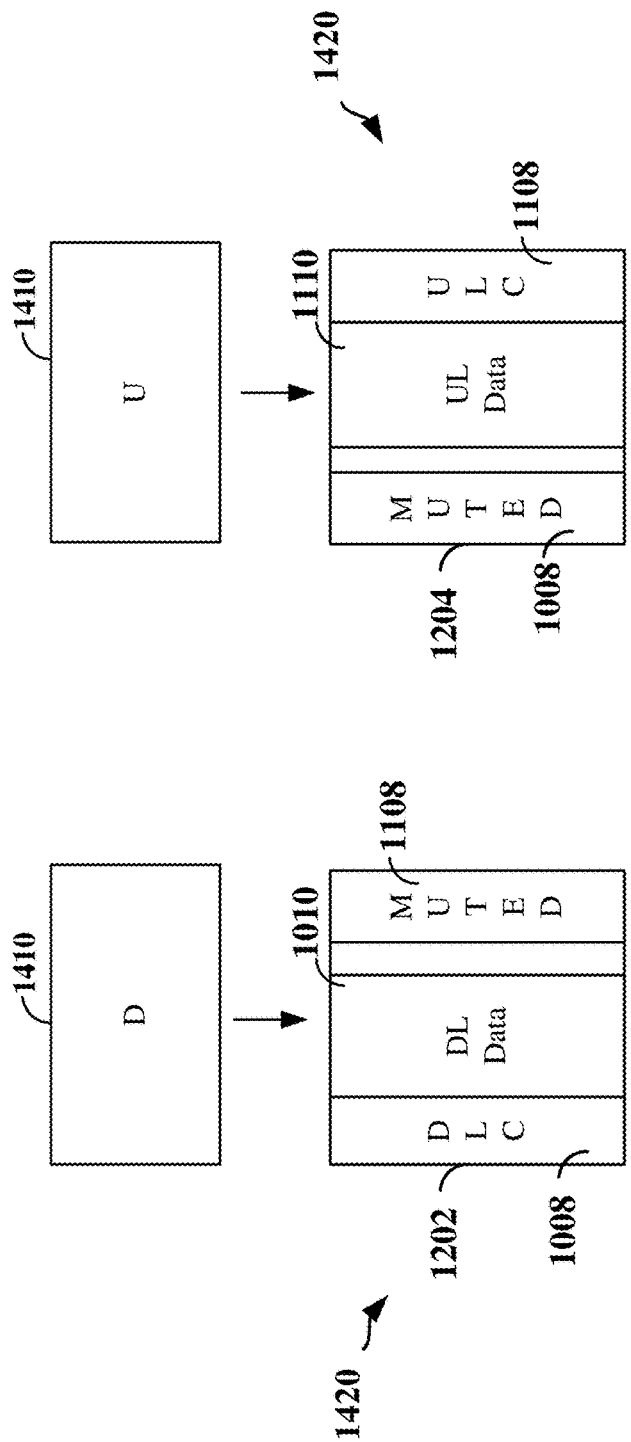
FIG. 16 is a diagram illustrating another exemplary alignment of uplink and downlink transmissions between legacy and next generation wireless communication networks.

FIG. 16 is a diagram illustrating another exemplary alignment of uplink and downlink transmissions between legacy and next generation wireless communication networks. In FIG. 16, each next generation subframe 1420 corresponds to one legacy subframe 1410. In addition, each next generation subframe 1420 may be configured to be a DL-centric subframe (for D legacy subframes) or UL-centric subframe (for U legacy subframes) having a structure shown in FIGS. 3-5. For example, the next generation subframe 1420 corresponding to the D legacy subframe may include a DL TTI Type 1 structure (e.g., a DL control portion 1004 and partial DL data portion 1010) and an UL TTI Type 0 structure (e.g., an UL control portion 1108) that collectively form a structure corresponding to the DL-centric subframe 1202 shown in FIG. 12. Similarly, the next generation subframe 1420 corresponding to the U legacy subframe may include an UL TTI Type 1 structure (e.g., an UL control portion 1108 and a partial UL data portion 1110) and a DL TTI Type 0 structure (e.g., a DL control portion 1008) that collectively form a structure corresponding to the UL-centric subframe 1204 shown in FIG. 12.

However, for D legacy subframes (or DL portions of S legacy subframes), the UL control portion 1108 (UL common burst) of the DL-centric subframe 1202 may be muted such that the channel/frequency band in the next generation wireless cell is devoid of any uplink transmissions during the UL control portion 1108 to avoid mixed interference with D legacy subframe transmissions. In addition, for U legacy subframes (or UL portions of S legacy subframes), the DL control portion 1008 (DL common burst) of the UL-centric subframe 1204 may be muted such that the channel/frequency band in the next generation wireless cell is devoid of any downlink transmissions during the DL control portion 1008 to avoid mixed interference with U legacy subframe transmissions. In this example, the control information that would typically have been sent in the muted control portions 1008 and 1108 may be sent on the next available common burst, which may introduce a delay and impact the HARQ timeline.

Figure 17:
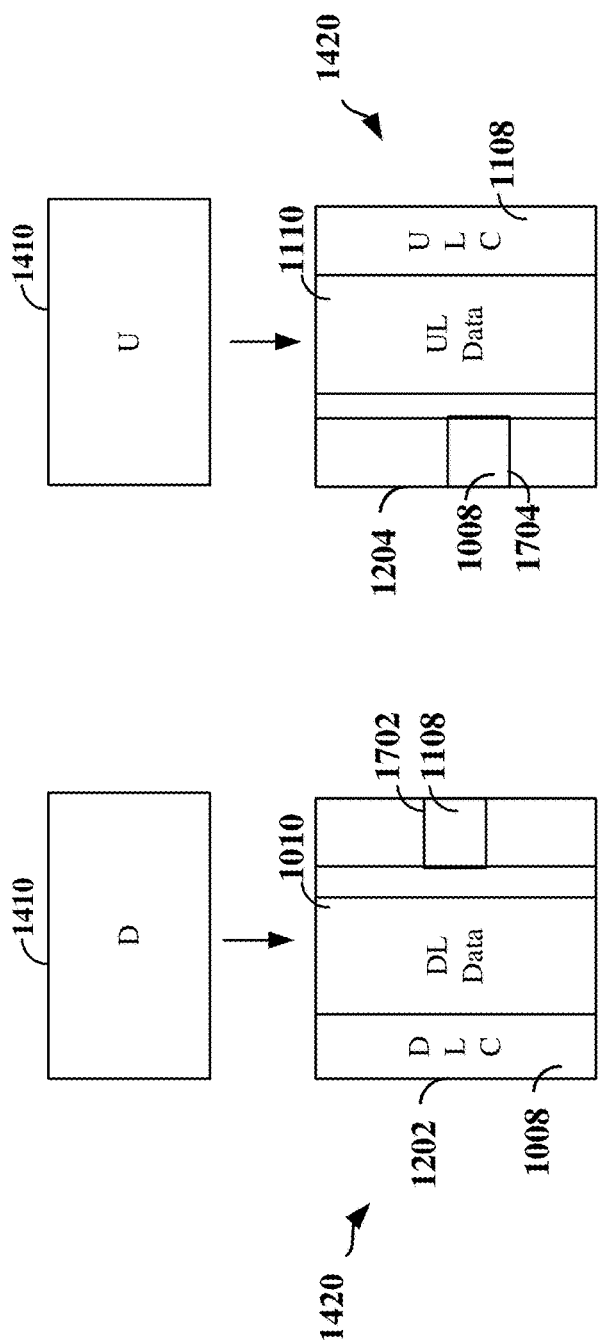
FIG. 17 is a diagram illustrating another exemplary alignment of uplink and downlink transmissions between legacy and next generation wireless communication networks.

FIG. 17 is a diagram illustrating another exemplary alignment of uplink and downlink transmissions between legacy and next generation wireless communication networks. In FIG. 17, each next generation subframe 1420 corresponds to one legacy subframe 1410. In addition, each next generation subframe 1420 may be configured to be a DL-centric subframe (for D legacy subframes) or UL-centric subframe (for U legacy subframes) having a structure shown in FIGS. 3-5. For example, the next generation subframe 1420 corresponding to the D legacy subframe may include a DL TTI Type 1 structure (e.g., a DL control portion 1004 and partial DL data portion 1010) and an UL TTI Type 0 structure (e.g., an UL control portion 1108) that collectively form a structure corresponding to the DL-centric subframe 1202 shown in FIG. 12. Similarly, the next generation subframe 1420 corresponding to the U legacy subframe may include an UL TTI Type 1 structure (e.g., an UL control portion 1108 and a partial UL data portion 1110) and a DL TTI Type 0 structure (e.g., a DL control portion 1008) that collectively form a structure corresponding to the UL-centric subframe 1204 shown in FIG. 12.

However, for D legacy subframes (or DL portions of S legacy subframes), the UL control portion 1108 (UL common burst) of the DL-centric subframe 1202 may be modified to use a narrow band 1702 (e.g., a narrow frequency band of an in-band frequency range over which the DL-centric subframe is transmitted, where the narrow frequency band occupies only apportion of the in-band frequency range). Likewise, for U legacy subframes (or UL portions of S legacy subframes), the DL control portion 1008 (DL common burst) of the UL-centric subframe 1204 may be modified to use a narrow band 1704. For example, the control information may be put on a narrow band with modified filtering, pulse shaping and/or power control to reduce the impact of mixed interference. In some examples, the narrow band may be a different component carrier (in-band with a large guard band) or the control information may be sent on a different FDD channel. By using a narrow band for the UL control portions 1008 and 1108, the next generation subframes 1420 corresponding to D and U legacy subframes 1410 may be self-contained.

Figure 18:
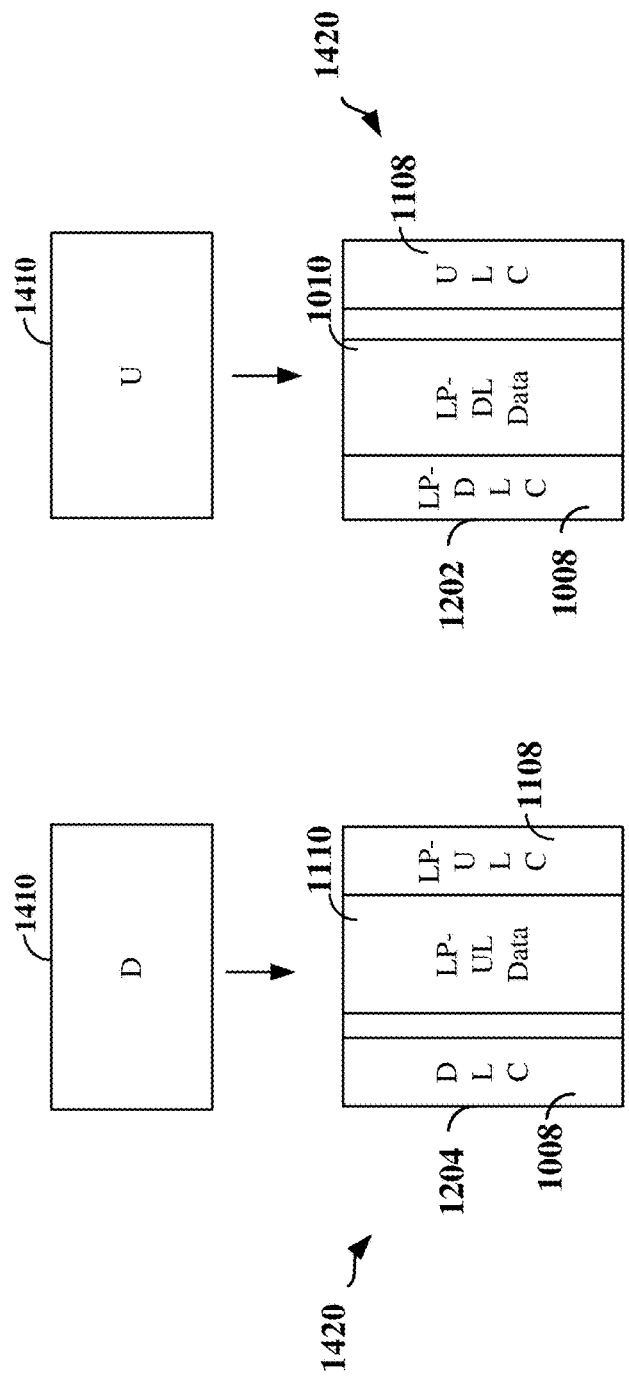
FIG. 18 is a diagram illustrating another exemplary alignment of uplink and downlink transmissions between legacy and next generation wireless communication networks.

FIG. 18 is a diagram illustrating another exemplary alignment of uplink and downlink transmissions between legacy and next generation wireless communication networks. In FIG. 18, each next generation subframe 1420 corresponds to one legacy subframe 1410. In addition, each next generation subframe 1420 may be configured to be a DL-centric subframe or UL-centric subframe having a structure shown in FIGS. 3-5. For example, the next generation subframe 1420 corresponding to the D legacy subframe may include a DL TTI Type 1 structure (e.g., a DL control portion 1004 and partial DL data portion 1010) and an UL TTI Type 0 structure (e.g., an UL control portion 1108) that collectively form a structure corresponding to the DL-centric subframe 1202 shown in FIG. 12. Similarly, the next generation subframe 1420 corresponding to the U legacy subframe may include an UL TTI Type 1 structure (e.g., an UL control portion 1108 and a partial UL data portion 1110) and a DL TTI Type 0 structure (e.g., a DL control portion 1008) that collectively form a structure corresponding to the UL-centric subframe 1204 shown in FIG. 12.

However, in the example shown in FIG. 18, DL-centric subframes 1202 may not be transmitted within the downlink transmit time of D legacy subframes and UL-centric subframes 1204 may not be transmitted within the uplink transmit time of U legacy subframes. Instead, one or more DL-centric subframes 1202 may be transmitted within the uplink transmit time of U legacy subframes and one or more UL-centric subframes 1204 may be transmitted within the downlink transmit time of D legacy subframes.

In the example shown in FIG. 18, the portions of the next generation subframes 1420 that are transmitted in the opposite direction as the corresponding legacy portions may be configured to use a lower power to mitigate the impact of mixed interference. For example, when transmitting a DL-centric subframe 1202 in a next generation cell simultaneous to transmitting a U legacy subframe in a legacy cell, the DL control portion 1008 (DL common burst) and DL data portion 1010 of the DL-centric subframe 1202 may be configured to use a lower power (LP) than the power normally used for a regular downlink transmission that is aligned with a downlink legacy configuration to minimize the mixed interference. For example, the next generation scheduling entity (e.g., as shown in FIG. 8) may be configured to utilize a first transmit power to transmit DL control and data when the DL portions of the next generation subframe are transmitted within the downlink transmit time of a D legacy subframe or S legacy subframe, and to utilize a second transmit power less than the first transmit power to transmit DL control and data when the DL portions of the next generation subframe are transmitted within the uplink transmit time of a U legacy subframe or S legacy subframe. The second transmit power is illustrated in FIG. 18 as a low power (LP) utilized in the DL control potion 1008 and DL data portion 1010 of the DL-centric subframe 1202.

Similarly, when transmitting an UL-centric subframe 1204 in a next generation cell simultaneous to transmitting a D legacy subframe in a legacy cell, the UL control portion 1108 (DL common burst) and UL data portion 1110 of the UL-centric subframe 1204 may be configured to use a lower power (LP) than the power normally used for a regular uplink transmission that is aligned with an uplink legacy configuration to minimize the mixed interference. For example, next generation subordinate entities (e.g., as shown in FIG. 9) in a next generation cell may each be configured to utilize a respective first transmit power to transmit UL control and data when the UL portions of the next generation subframe are transmitted within the uplink transmit time of a U legacy subframe or S legacy subframe, and to utilize a respective second transmit power less than the first power to transmit UL control and data when the UL portions of the next generation subframe are transmitted within the downlink transmit time of a D legacy subframe or S legacy subframe. The second transmit power is illustrated in FIG. 18 as a low power (LP) utilized in the UL data potion 1110 and UL control portion 1108 of the UL-centric subframe

1204. Such a power reduction may introduce constraints on the scheduling entity as to which UEs are scheduled and the rates allocated to each UE. However, allowing self-contained next generation subframes may lower the latency in the cell.

Figure 19:
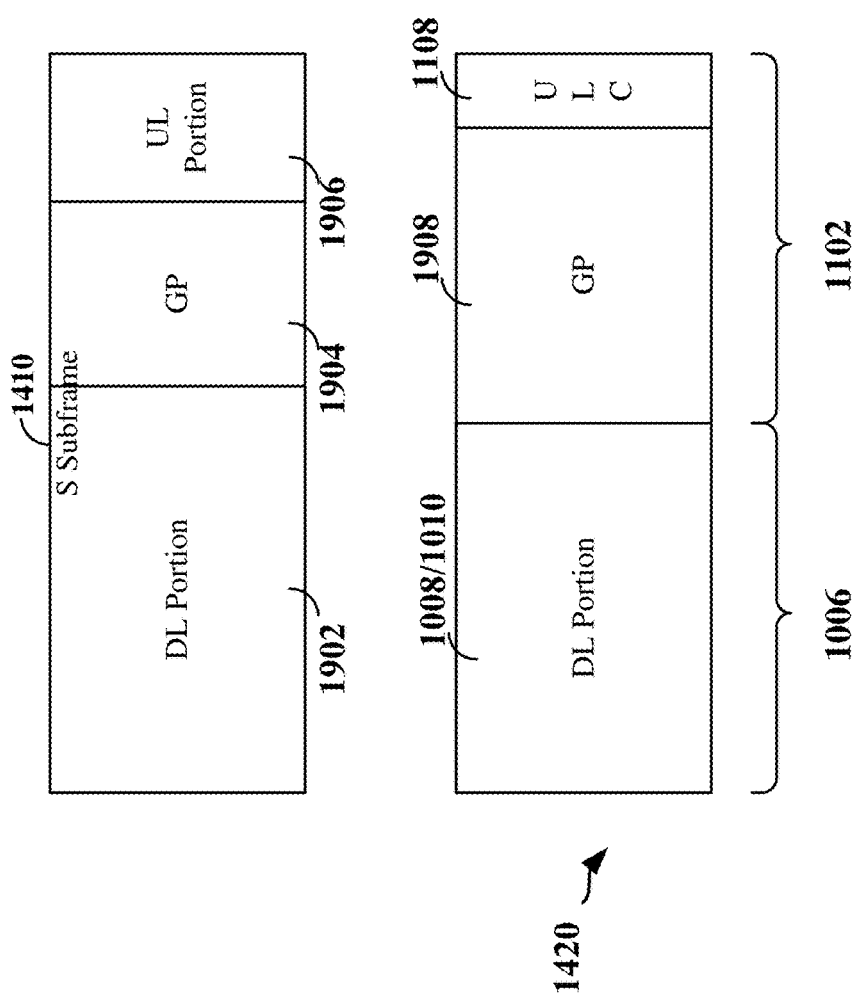
FIG. 19 is a diagram illustrating another exemplary alignment of uplink and downlink transmissions between legacy and next generation wireless communication networks.

FIG. 19 is a diagram illustrating another exemplary alignment of uplink and downlink transmissions between legacy and next generation wireless communication networks. FIG. 19 illustrates the alignment between an S legacy subframe 1410 and a next generation subframe 1420. In FIG. 19, the uplink and downlink transmissions are aligned between the S legacy subframe 1410 and the next generation subframe 1410. For example, the next generation subframe 1420 structure may be configured using a DL TTI Type 2 structure 1006 and an UL TTI Type 0 structure 1102. Thus, a DL portion (e.g., a DL control portion 1008 and a DL data portion 1010) of the next generation subframe 1420 may transmitted within the transmit time of a DL portion 1702 of the S legacy subframe 1410. In addition, an UL portion (e.g., UL control portion 1108) of the next generation subframe 1420 may be transmitted within the transmit time of an UL portion 1906 of the S legacy subframe 1410.

However, respective guard periods 1904 and 1908 between uplink and downlink transmissions may vary depending on the configurations of the next generation and legacy subframes. In the example shown in FIG. 19, the next generation subframe 1420 provides a larger guard period 1908 than the guard period 1904 in the S legacy subframe 1410.

Figure 20:
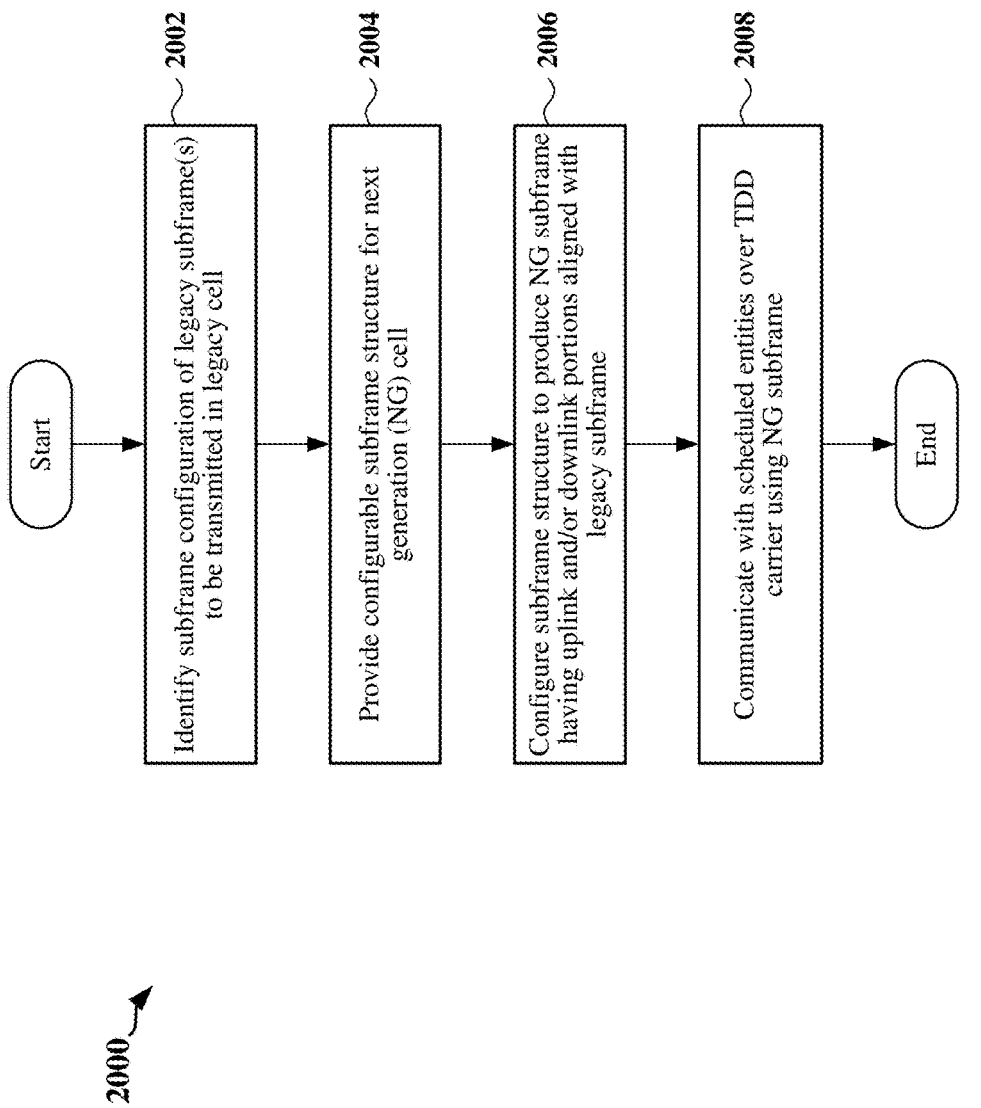
FIG. 20 is a flow chart of a method of wireless communication that enables alignment of uplink and downlink transmissions between legacy and next generation wireless communication networks.

FIG. 20 is a flow chart illustrating an exemplary method 2000 of wireless communication that enables alignment of uplink and downlink transmissions between legacy and next generation wireless communication networks in accordance with some aspects of the present disclosure. As described below, some or all illustrated features may be omitted in a particular implementation within the scope of the present disclosure, and some illustrated features may not be required for implementation of all embodiments. In some examples, the method 2000 may be carried out by the next generation scheduling entity 800 illustrated in FIG. 8. In some examples, the method 2000 may be carried out by any suitable apparatus or means for carrying out the functions or algorithm described below.

At block 2002, the scheduling entity may identify a subframe configuration for at least one legacy subframe in a legacy network (e.g., a legacy cell utilizing a legacy RAT). For example, the subframe configuration for the legacy subframe may include a downlink portion (e.g., for a D legacy subframe), an uplink portion (e.g., for a U legacy subframe) or a combination of uplink and downlink portions (e.g., for an S legacy subframe). The subframe configuration may further indicate a transmission direction sequence for a plurality of subframes (e.g., a particular sequential combination of D, U and/or S legacy subframes). For example, the legacy subframe circuitry 844 shown and described above with reference to FIG. 8 may identify the legacy subframe configuration.

In some examples, the scheduling entity may communicate with one or more neighboring legacy scheduling entities (i.e., eNBs) over the X2 interface to receive legacy subframe configuration information. In other examples, the scheduling entity may receive a control channel containing the legacy subframe configuration information broadcast from a neighboring legacy scheduling entity. In still other examples, the scheduling entity may receive the legacy subframe configuration information from one or more subordinate entities in wireless communication with the scheduling entity.

At block 2004, the scheduling entity may provide a configurable TDD subframe structure for use in configuring one or more next generation subframes. In some examples, the scheduling entity may provide a configurable subframe structure including a downlink portion (e.g., downlink control portion and/or downlink data portion) and an uplink portion (e.g., uplink control portion and/or uplink data portion). For example, the subframe structure and configuration circuitry 855 shown and described above with reference to FIG. 8 may provide the configurable TDD subframe structure.

At block 2006, the scheduling entity may configure the configurable subframe structure to produce a next generation subframe based on the legacy subframe configuration. In some examples, the scheduling entity may configure the next generation subframe to align uplink and/or downlink portions of the legacy and next generation subframes. For example, the subframe structure and configuration circuitry 855 shown and described above with reference to FIG. 8 may configure the configurable subframe structure and the resource assignment and subframe generation circuitry 841 shown and described above with reference to FIG. 8 may produce the next generation subframe in accordance with the configured structure. At block 2008, the scheduling entity may communicate with one or more subordinate entities using the next generation subframe. For example, the DL data and control channel generation and transmission circuitry 842 and/or the UL data and control channel reception and processing circuitry 843 shown and described above with reference to FIG. 8 may communicate using the configured next generation subframe.

Figure 21:
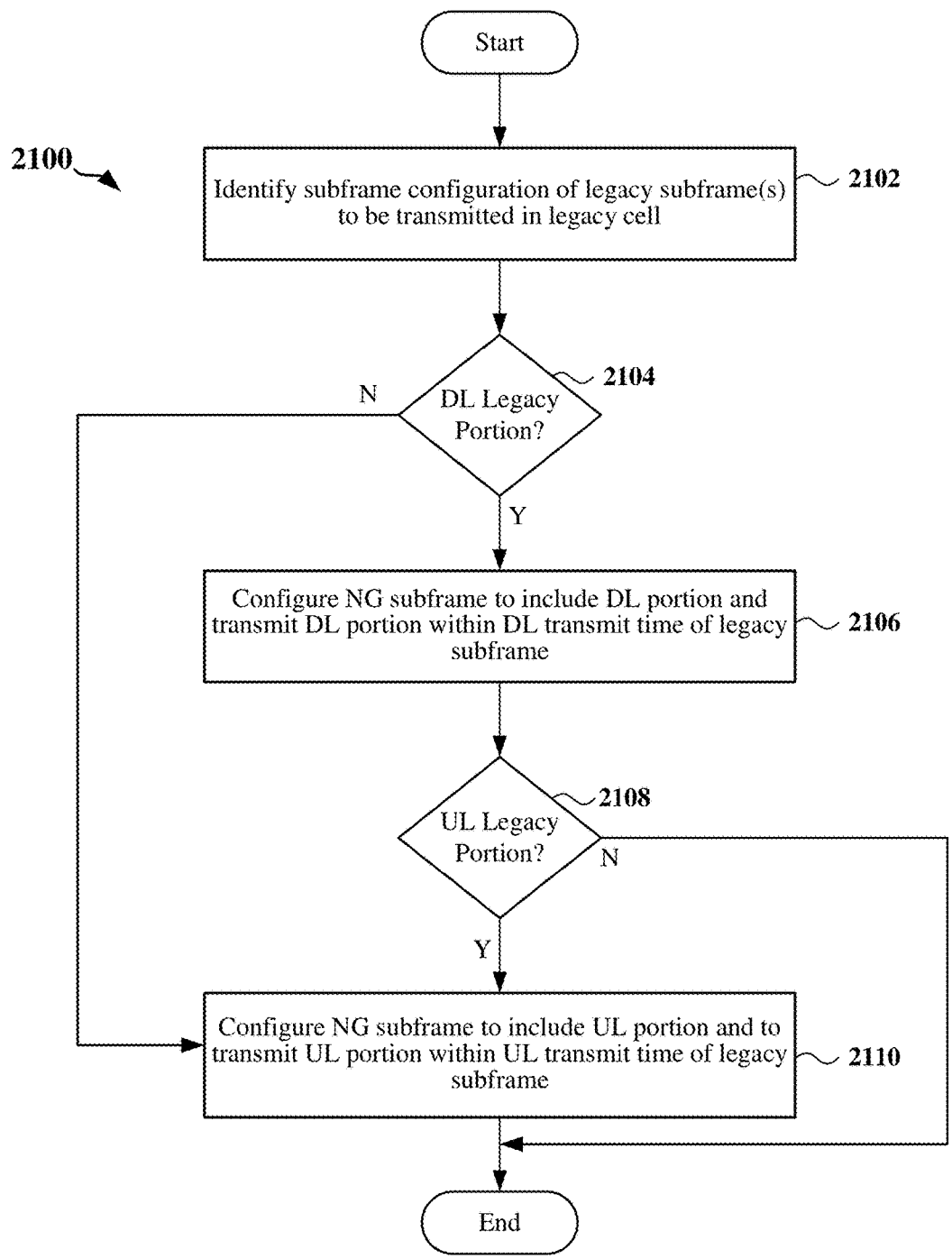
FIG. 21 is a flow chart of another method of wireless communication that enables alignment of uplink and downlink transmissions between legacy and next generation wireless communication networks.

FIG. 21 is a flow chart illustrating an exemplary method 2100 of wireless communication that enables alignment of uplink and downlink transmissions between legacy and next generation wireless communication networks in accordance with some aspects of the present disclosure. As described below, some or all illustrated features may be omitted in a particular implementation within the scope of the present disclosure, and some illustrated features may not be required for implementation of all embodiments. In some examples, the method 2100 may be carried out by the scheduling entity 800 illustrated in FIG. 8. In some examples, the method 2100 may be carried out by any suitable apparatus or means for carrying out the functions or algorithm described below.

At block 2102, the scheduling entity may identify a subframe configuration for at least one legacy subframe in a legacy network (e.g., a legacy cell utilizing a legacy RAT). For example, the subframe configuration for the legacy subframe may include a downlink portion (e.g., for a D legacy subframe), an uplink portion (e.g., for a U legacy subframe) or a combination of uplink and downlink portions (e.g., for an S legacy subframe). The subframe configuration may further indicate a transmission direction sequence for a plurality of subframes (e.g., a particular sequential combination of D, U and/or S legacy subframes). For example, the legacy subframe circuitry 844 shown and described above with reference to FIG. 8 may identify the legacy subframe configuration.

In some examples, the scheduling entity may communicate with one or more neighboring legacy scheduling entities (i.e., eNBs) over the X2 interface to receive legacy subframe configuration information. In other examples, the scheduling entity may receive a control channel containing the legacy subframe configuration information broadcast from a neighboring legacy scheduling entity. In still other examples, the scheduling entity may receive the legacy subframe configuration information from one or more subordinate entities in wireless communication with the scheduling entity.

At block 2104, the scheduling entity may determine whether the at least one legacy subframe to be transmitted in the legacy cell includes a downlink (DL) portion based on the legacy subframe configuration information. For example, the legacy subframe circuitry 844 shown and described above with reference to FIG. 8 may determine whether the legacy subframe includes a DL portion. If the legacy subframe to be transmitted does include a DL portion (Y branch of 2104), at block 2106, the scheduling entity may configure a next generation subframe to include a DL portion and to transmit the DL portion within a DL transmit time of the legacy subframe (e.g., at substantially the same time as the DL portion of the legacy subframe). For example, the subframe structure and configuration circuitry 855 shown and described above with reference to FIG. 8 may configure the next generation subframe to include the DL portion and the resource assignment and subframe generation circuitry 841 shown and described above with reference to FIG. 8 may schedule the next generation subframe to transmit the DL portion within the DL transmit time of the legacy subframe.

At block 2108, the scheduling entity may further determine whether the at least one legacy subframe to be transmitted in the legacy cell includes an uplink (UL) portion based on the legacy subframe configuration information. For example, the legacy subframe circuitry 844 shown and described above with reference to FIG. 8 may determine whether the legacy subframe includes an UL portion. If the legacy subframe to be transmitted does include a UL portion (Y branch of 2108), at block 2110, the scheduling entity may configure a next generation subframe to include an UL portion and to transmit the UL portion within an UL transmit time of the legacy subframe (e.g., at substantially the same time as the UL portion of the legacy subframe). For example, the subframe structure and configuration circuitry 855 shown and described above with reference to FIG. 8 may configure the next generation subframe to include the UL portion and the resource assignment and subframe generation circuitry 841 shown and described above with reference to FIG. 8 may schedule the next generation subframe to transmit the UL portion within the UL transmit time of the legacy subframe.

Figure 22:
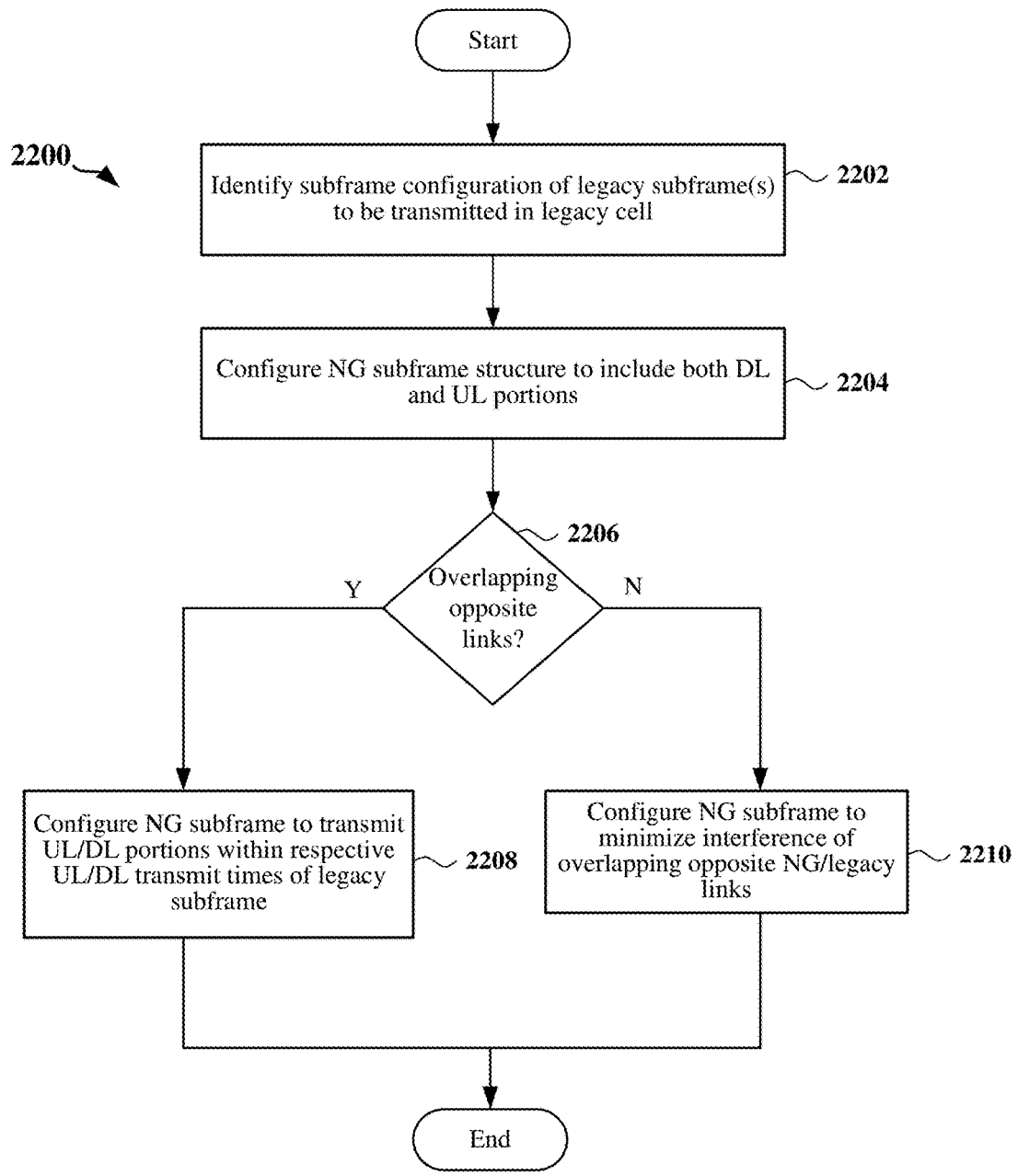
FIG. 22 is a flow chart of another method of wireless communication that enables alignment of uplink and downlink transmissions between legacy and next generation wireless communication networks.

FIG. 22 is a flow chart illustrating an exemplary method 2200 of wireless communication that enables alignment of uplink and downlink transmissions between legacy and next generation wireless communication networks in accordance with some aspects of the present disclosure. As described below, some or all illustrated features may be omitted in a particular implementation within the scope of the present disclosure, and some illustrated features may not be required for implementation of all embodiments. In some examples, the method 2200 may be carried out by the scheduling entity 800 illustrated in FIG. 8. In some examples, the method 2200 may be carried out by any suitable apparatus or means for carrying out the functions or algorithm described below.

At block 2202, the scheduling entity may identify a subframe configuration for at least one legacy subframe in a legacy network (e.g., a legacy cell utilizing a legacy RAT). For example, the subframe configuration for the legacy subframe may include a downlink portion (e.g., for a D legacy subframe), an uplink portion (e.g., for a U legacy subframe) or a combination of uplink and downlink portions (e.g., for an S legacy subframe). The subframe configuration may further indicate a transmission direction sequence for a plurality of subframes (e.g., a particular sequential combination of D, U and/or S legacy subframes). For example, the legacy subframe circuitry 844 shown and described above with reference to FIG. 8 may identify the legacy subframe configuration.

In some examples, the scheduling entity may communicate with one or more neighboring legacy scheduling entities (i.e., eNBs) over the X2 interface to receive legacy subframe configuration information. In other examples, the scheduling entity may receive a control channel containing the legacy subframe configuration information broadcast from a neighboring legacy scheduling entity. In still other examples, the scheduling entity may receive the legacy subframe configuration information from one or more subordinate entities in wireless communication with the scheduling entity.

At block 2204, the scheduling entity may configure a configurable TDD next generation subframe structure to include both a downlink (DL) portion (e.g., downlink control portion and/or downlink data portion) and an uplink (UL) portion (e.g., uplink control portion and/or uplink data portion). In some examples, the next generation subframe structure may include a combination of the DL TTI Type 0 structure and the UL TTI Type 1 structure or a combination of the DL TTI Type 1 structure and the UL TTI Type 0 structure. For example, the subframe structure and configuration circuitry 855 shown and described above with reference to FIG. 8 may configure the configurable TDD subframe structure.

At block 2206, the scheduling entity may determine whether the DL portion or UL portion of the next generation subframe will overlap in time with an opposite direction link in the legacy subframe(s). For example, the scheduling entity may determine whether either the DL portion (or part thereof) in the next generation subframe will be transmitted at substantially the same time as an UL portion in the legacy subframe (e.g., within an uplink transmit time of the legacy subframe) or the UL portion (or part thereof) in the next generation subframe will be transmitted at substantially the same time as a DL portion in the legacy subframe (e.g., within a downlink transmit time of the legacy subframe). For example, the subframe structure and configuration circuitry 855 shown and described above with reference to FIG. 8 may determine whether overlapping opposite links in the legacy and next generation subframes will occur.

If the scheduling entity determines that there will not be an overlap in opposite links between the legacy and next generation subframes (N branch of 2206), at block 2208, the scheduling entity may configure the next generation subframe to transmit the UL and DL portions of the next generation subframe within respective UL and DL transmit times of the legacy subframe(s). For example, the scheduling entity may configure the next generation subframe to enable the DL portion to be transmitted within a DL transmit time of a DL portion of the legacy subframe(s). In addition, the scheduling entity may configure the next generation subframe to enable the UL portion to be transmitted within an UL transmit time of an UL portion of the legacy subframe(s). For example, the subframe structure and configuration circuitry 855 shown and described above with reference to FIG. 8 may configure the next generation subframe to align the UL and DL portions of the next generation and legacy subframes.

If the scheduling entity determines that there will be an overlap in opposite links between the legacy and next generation subframes (Y branch of 2206), at block 2210, the scheduling entity may configure the next generation subframe to minimize interference of the overlapping opposite links of the next generation and legacy subframes. In some examples, the scheduling entity may configure the overlapping opposite next generation UL/DL portion to be transmitted within a narrow frequency band of an in-band frequency range over which the next generation subframe is transmitted. In another example, the scheduling entity may configure the overlapping opposite next generation UL/DL portion to be transmitted in a secondary component TDD carrier separated by a guard frequency band from a primary component TDD carrier on which the overlapping opposite legacy DL/UL portion is transmitted. In another example, the scheduling entity may configure the overlapping opposite next generation UL/DL portion to be transmitted at a power lower than the power configured for a regular (non-overlapping/opposite) next generation UL/DL transmission. For example, the subframe structure and configuration circuitry 855 shown and described above with reference to FIG. 8 may configure the next generation subframe to minimize interference between overlapping opposite links in next generation and legacy subframes.

Figure 23:
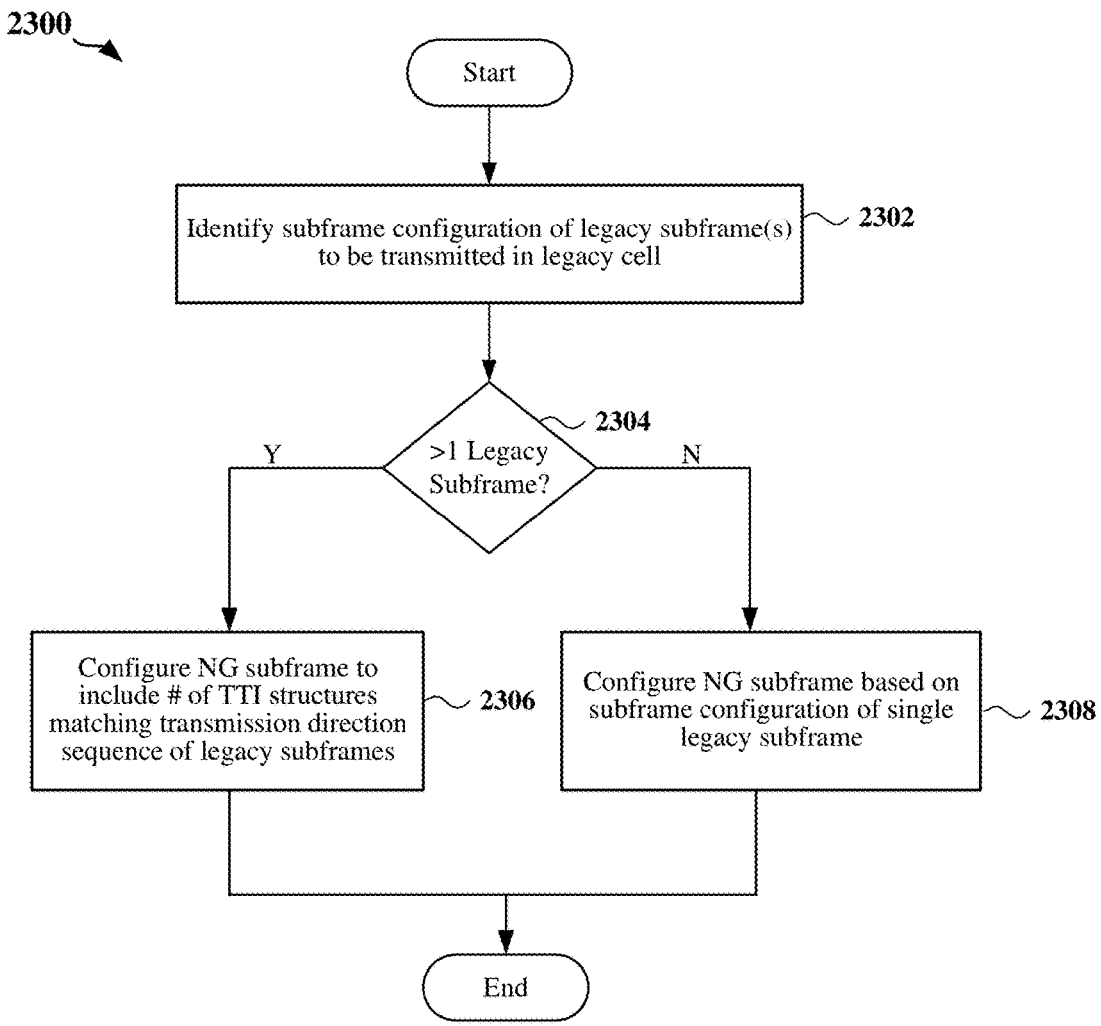
FIG. 23 is a flow chart of another method of wireless communication that enables alignment of uplink and downlink transmissions between legacy and next generation wireless communication networks.

FIG. 23 is a flow chart illustrating an exemplary method 2300 of wireless communication that enables alignment of uplink and downlink transmissions between legacy and next generation wireless communication networks in accordance with some aspects of the present disclosure. As described below, some or all illustrated features may be omitted in a particular implementation within the scope of the present disclosure, and some illustrated features may not be required for implementation of all embodiments. In some examples, the method 2300 may be carried out by the scheduling entity 800 illustrated in FIG. 8. In some examples, the method 2300 may be carried out by any suitable apparatus or means for carrying out the functions or algorithm described below.

At block 2302, the scheduling entity may identify a subframe configuration for at least one legacy subframe in a legacy network (e.g., a legacy cell utilizing a legacy RAT). For example, the subframe configuration for the legacy subframe may include a downlink portion (e.g., for a D legacy subframe), an uplink portion (e.g., for a U legacy subframe) or a combination of uplink and downlink portions (e.g., for an S legacy subframe). The subframe configuration may further indicate a transmission direction sequence for a plurality of subframes (e.g., a particular sequential combination of D, U and/or S legacy subframes). For example, the legacy subframe circuitry 844 shown and described above with reference to FIG. 8 may identify the legacy subframe configuration.

In some examples, the scheduling entity may communicate with one or more neighboring legacy scheduling entities (i.e., eNBs) over the X2 interface to receive legacy subframe configuration information. In other examples, the scheduling entity may receive a control channel containing the legacy subframe configuration information broadcast from a neighboring legacy scheduling entity. In still other examples, the scheduling entity may receive the legacy subframe configuration information from one or more subordinate entities in wireless communication with the scheduling entity.

At block 2304, the scheduling entity may determine whether a next generation subframe should be a multi-TTI subframe corresponding to more than one legacy subframe (e.g., a sequence of two or more consecutive legacy subframe). In general, a multi-TTI subframe may include more than one DL TTI structure and/or more than one UL TTI structure and may have a subframe duration greater than equal to twice the single TTI structure duration. For example, the subframe structure and configuration circuitry 855 shown and described above with reference to FIG. 8 may determine whether a multi-TTI next generation subframe structure should be utilized.

If a multi-TTI next generation subframe structure is to be used (Y branch of 2304), at block 2306, the scheduling entity may configure a next generation subframe to include a number of TTI structures corresponding to the number of legacy subframes in the sequence of two or more consecutive legacy subframes. In some examples, the scheduling entity may configure the next generation subframe such that the TTI structures included in the next generation subframe match the transmission direction sequence of the legacy subframes. For example, for each D legacy subframe, the scheduling entity may include a DL TTI Type 2 structure in the next generation subframe. As another example, for each U legacy subframe, the scheduling entity may include an UL TTI Type 2 structure in the next generation subframe. As another example, for each S legacy subframe, the scheduling entity may include a combination of DL/UL TTI structures forming DL-centric or UL-centric subframe structures corresponding to the S legacy subframe transmission direction sequence. For example, the subframe structure and configuration circuitry 855 shown and described above with reference to FIG. 8 may configure the next generation subframe as a multi-TTI subframe.

If a multi-TTI structure is not to be used (N branch of 2304), at block 2308, the scheduling entity may configure a next generation subframe based on the subframe configuration of a single legacy subframe. For example, the scheduling entity may configure the next generation subframe to include a DL TTI Type 2 structure if the legacy subframe is a D subframe, an UL TTI Type 2 structure is the legacy subframe is a U subframe and a combination of DL/UL TTI structures if the legacy subframe is an S subframe. In some examples, the scheduling entity may determine the duration of the legacy subframe and configure the next generation subframe to have a duration substantially equal to the duration of the legacy subframe. For example, the subframe structure and configuration circuitry 855 shown and described above with reference to FIG. 8 may configure the next generation subframe as a single TTI subframe.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-23 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-23 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for a scheduling entity to communicate with a set of one or more subordinate entities in a wireless communication network, the method comprising:
   identifying a first subframe configuration of at least one first subframe to be transmitted in a first cell utilizing a first radio access technology (RAT), the at least one first subframe configuration comprising at least one of a first downlink portion or a first uplink portion;
   providing a configurable subframe structure for a time division duplex (TDD) carrier utilized in a second cell adjacent the first cell, the second cell utilizing a second RAT and the configurable subframe structure comprising at least one of a second downlink portion or a second uplink portion;
   configuring the configurable subframe structure to produce a second subframe for transmission in the second cell substantially simultaneous to transmission of the at least one first subframe in the first cell, wherein the second subframe comprises at least one of the second downlink portion or the second uplink portion; and
   communicating between the scheduling entity and the set of one or more subordinate entities using the second subframe;
   wherein at least one of the second downlink portion of the second subframe is transmitted within a downlink transmit time of the first downlink portion of the at least one first subframe or the second uplink portion of the second subframe is received within an uplink transmit time of the first uplink portion of the at least one first subframe;
   wherein a narrow frequency band of an in-band frequency range over which the second subframe is transmitted is utilized when either transmitting the second downlink portion of the second subframe within the uplink transmit time of the first uplink portion of the at least one first subframe or receiving the second uplink portion of the second subframe within the downlink transmit time of the first downlink portion of the at least one first subframe, wherein the narrow frequency band occupies only a portion of the in-band frequency range.

2. The method of claim 1, wherein configuring the configurable subframe structure further comprises:
   determining a first duration of the at least one first subframe; and
   configuring the configurable subframe structure to produce the second subframe comprising a second duration substantially equal to the first duration.

3. The method of claim 1, wherein the at least one first subframe comprises the first downlink portion.

4. The method of claim 3, wherein configuring the configurable subframe structure further comprises:
   configuring the configurable subframe structure to produce the second subframe comprising the second downlink portion to be transmitted within the downlink transmit time of the first downlink portion of the at least one first subframe;

wherein the second downlink portion comprises at least one of a downlink control portion for transmitting downlink control information from the scheduling entity to the set of one or more subordinate entities or a downlink data portion for transmitting downlink data from the scheduling entity to the set of one of or more subordinate entities.

5. The method of claim 4, wherein configuring the configurable subframe structure further comprises:
configuring the configurable subframe structure to produce the second subframe further comprising a guard period following the downlink data portion; and
configuring the configurable subframe structure to produce the second subframe further comprising the second uplink portion following the guard period;
wherein the second uplink portion is further received within the downlink transmit time of the first downlink portion of the at least one first subframe;
wherein the second uplink portion comprises an uplink control portion for receiving uplink control information transmitted from the set of one or more subordinate entities to the scheduling entity.

6. The method of claim 5, wherein communicating between the scheduling entity and the set of one or more subordinate entities further comprises:
receiving the uplink control information within the narrow frequency band of the in-band frequency range over which the second subframe is transmitted.

7. The method of claim 5, wherein communicating between the scheduling entity and the set of one or more subordinate entities further comprises:
receiving the uplink control information over a first component carrier separated by a guard band from a second component carrier over which the at least one first subframe is transmitted.

8. The method of claim 5, wherein the uplink control information is received at a first transmit power when the second uplink portion is received within the uplink transmit time of the first uplink portion of the at least one first subframe, and wherein communicating between the scheduling entity and the set of one or more subordinate entities further comprises:
receiving the uplink control information at a second transmit power less than the first transmit power when the uplink control information is received within the downlink transmit time of the first downlink portion of the at least one first subframe.

9. The method of claim 4, wherein configuring the configurable subframe structure further comprises:
configuring the configurable subframe structure to produce the second subframe further comprising a guard period following the downlink control portion; and
configuring the configurable subframe structure to produce the second subframe further comprising the second uplink portion following the guard period;
wherein the second uplink portion is further received within the downlink transmit time of the first downlink portion of the at least one first subframe;
wherein the second uplink portion comprises an uplink data portion for receiving uplink data transmitted from the set of one or more subordinate entities to the scheduling entity and an uplink control portion for receiving uplink control information transmitted from the set of one or more subordinate entities to the scheduling entity;
wherein the second subframe lacks the downlink data portion.

10. The method of claim 9, wherein the uplink data and the uplink control information are received at a first transmit power when the second uplink portion is received within the uplink transmit time of the first uplink portion of the at least one first subframe, and wherein communicating between the scheduling entity and the set of one or more subordinate entities further comprises:
receiving the uplink data and the uplink control information at a second transmit power less than the first power when the uplink data and the uplink control information are received within the downlink transmit time of the first downlink portion of the at least one first subframe.

11. The method of claim 1, wherein the at least one first subframe comprises the first uplink portion.

12. The method of claim 11, wherein configuring the configurable subframe structure further comprises:
configuring the configurable subframe structure to produce the second subframe comprising the second uplink portion to be received within the uplink transmit time of the first uplink portion of the at least one first subframe;
wherein the second uplink portion comprises at least one of an uplink control portion for receiving uplink control information transmitted from the set of one or more subordinate entities to the scheduling entity and an uplink data portion for receiving uplink data transmitted from the set of one or more subordinate entities to the scheduling entity.

13. The method of claim 12, wherein configuring the configurable subframe structure further comprises:
configuring the configurable subframe structure to produce the second subframe further comprising a guard period immediately prior to the uplink data portion; and
configuring the configurable subframe structure to produce the second subframe further comprising the second downlink portion immediately prior to the guard period;
wherein the second downlink portion is further transmitted within the uplink transmit time of the first uplink portion of the at least one first subframe;
wherein the second downlink portion comprises a downlink control portion for transmitting downlink control information from the scheduling entity to the set of one or more subordinate entities.

14. The method of claim 13, wherein communicating between the scheduling entity and the set of one or more subordinate entities further comprises:
receiving the downlink control information within the narrow frequency band of the in-band frequency range over which the second subframe is transmitted.

15. The method of claim 13, wherein communicating between the scheduling entity and the set of one or more subordinate entities further comprises:
receiving the downlink control information over a first component carrier separated by a guard band from a second component carrier over which the at least one first subframe is transmitted.

16. The method of claim 13, wherein the downlink control information is transmitted at a first transmit power when the second downlink portion is transmitted within the downlink transmit time of the first downlink portion of the at least one first subframe, and wherein communicating between the scheduling entity and the set of one or more subordinate entities further comprises:

transmitting the downlink control information at a second transmit power less than the first power when the downlink control information is transmitted within the uplink transmit time of the first uplink portion of the at least one first subframe.

17. The method of claim 12, wherein configuring the configurable subframe structure further comprises:
configuring the configurable subframe structure to produce the second subframe further comprising a guard period immediately prior to the uplink control portion; and
configuring the configurable subframe structure to produce the second subframe further comprising the second downlink portion immediately prior to the guard period;
wherein the second downlink portion is further transmitted within the uplink transmit time of the first uplink portion of the at least one first subframe;
wherein the second downlink portion comprises a downlink data portion for transmitting downlink data from the set of one or more subordinate entities to the scheduling entity and a downlink control portion for transmitting downlink control information from the set of one or more subordinate entities to the scheduling entity;
wherein the second subframe lacks the uplink data portion.

18. The method of claim 17, wherein the downlink data and the downlink control information are transmitted at a first transmit power when the second downlink portion is transmitted within the downlink transmit time of the first downlink portion of the at least one first subframe, and wherein communicating between the scheduling entity and the set of one or more subordinate entities further comprises:
transmitting the downlink data and the downlink control information at a second transmit power less than the first power when the downlink data and the downlink control information are transmitted within the uplink transmit time of the first uplink portion of the at least one first subframe.

19. The method of claim 1, wherein identifying the first subframe configuration for the at least one first subframe further comprises:
determining a transmission direction sequence of a plurality of consecutive first subframes to be transmitted in the first cell.

20. The method of claim 19, wherein configuring the configurable subframe structure further comprises:
configuring the configurable subframe structure to produce a plurality of consecutive second subframes matching the transmission direction sequence of the plurality of consecutive first subframes.

21. The method of claim 19, wherein configuring the configurable subframe structure further comprises:
producing the second subframe comprised of a plurality of transmission time interval structures matching the transmission direction sequence of the plurality of consecutive first subframes;
wherein each of the plurality of transmission time interval structures comprises at least one of the second downlink portion or the second uplink portion.

22. The method of claim 1, wherein communicating between the scheduling entity and the set of one or more subordinate entities further comprises:
communicating a second subframe configuration of the second subframe to the set of one or more subordinate entities.

23. A scheduling entity in a wireless communication network, comprising:
a transceiver for wirelessly communicating with a set of one or more subordinate entities utilizing a time division duplex (TDD) carrier;
a memory; and
a processor communicatively coupled to the transceiver and the memory, the processor configured to:
identify a first subframe configuration of at least one first subframe to be transmitted in a first cell utilizing a first radio access technology (RAT), the at least one first subframe configuration comprising at least one of a first downlink portion or a first uplink portion;
provide a configurable subframe structure for a time division duplex (TDD) carrier utilized in a second cell adjacent the first cell, the second cell utilizing a second RAT and the configurable subframe structure comprising at least one of a second downlink portion or a second uplink portion;
configure the configurable subframe structure to produce a second subframe for transmission in the second cell substantially simultaneous to transmission of the at least one first subframe in the first cell, wherein the second subframe comprises at least one of the second downlink portion or the second uplink portion; and
communicate between the scheduling entity and the set of one or more subordinate entities using the second subframe;
wherein at least one of the second downlink portion of the second subframe is transmitted within a downlink transmit time of the first downlink portion of the at least one first subframe or the second uplink portion of the second subframe is received within an uplink transmit time of the first uplink portion of the at least one first subframe
wherein a narrow frequency band of an in-band frequency range over which the second subframe is transmitted is utilized when either transmitting the second downlink portion of the second subframe within the uplink transmit time of the first uplink portion of the at least one first subframe or receiving the second uplink portion of the second subframe within the downlink transmit time of the first downlink portion of the at least one first subframe, wherein the narrow frequency band occupies only a portion of the in-band frequency range.

24. The scheduling entity of claim 23, wherein the processor is further configured to:
determine a first duration of the at least one first subframe; and
configure the configurable subframe structure to produce the second subframe comprising a second duration substantially equal to the first duration.

25. The scheduling entity of claim 23, wherein the processor is further configured to:
determine a transmission direction sequence of a plurality of consecutive first subframes to be transmitted in the first cell; and
produce the second subframe comprised of a plurality of transmission time interval structures matching the transmission direction sequence of the plurality of consecutive first subframes;
wherein each of the plurality of transmission time interval structures comprises at least one of the second downlink portion or the second uplink portion.

26. A scheduling entity apparatus in a wireless communication network comprising:
- means for identifying a first subframe configuration of at least one first subframe to be transmitted in a first cell utilizing a first radio access technology (RAT), the at least one first subframe configuration comprising at least one of a first downlink portion or a first uplink portion;
- means for providing a configurable subframe structure for a time division duplex (TDD) carrier utilized in a second cell adjacent the first cell, the second cell utilizing a second RAT and the configurable subframe structure comprising at least one of a second downlink portion or a second uplink portion;
- means for configuring the configurable subframe structure to produce a second subframe for transmission in the second cell substantially simultaneous to transmission of the at least one first subframe in the first cell, wherein the second subframe comprises at least one of the second downlink portion or the second uplink portion; and
- means for communicating between the scheduling entity and the set of one or more subordinate entities using the second subframe;
- wherein at least one of the second downlink portion of the second subframe is transmitted within a downlink transmit time of the first downlink portion of the at least one first subframe or the second uplink portion of the second subframe is received within an uplink transmit time of the first uplink portion of the at least one first subframe;
- wherein a narrow frequency band of an in-band frequency range over which the second subframe is transmitted is utilized when either transmitting the second downlink portion of the second subframe within the uplink transmit time of the first uplink portion of the at least one first subframe or receiving the second uplink portion of the second subframe within the downlink transmit time of the first downlink portion of the at least one first subframe, wherein the narrow frequency band occupies only a portion of the in-band frequency range.

27. The scheduling entity apparatus of claim 26, further comprising:
- means for determining a first duration of the at least one first subframe; and
- means for configuring the configurable subframe structure to produce the second subframe comprising a second duration substantially equal to the first duration.

28. The scheduling entity apparatus of claim 26, further comprising:
- means for determining a transmission direction sequence of a plurality of consecutive first subframes to be transmitted in the first cell; and
- means for producing the second subframe comprised of a plurality of transmission time interval structures matching the transmission direction sequence of the plurality of consecutive first subframes;
- wherein each of the plurality of transmission time interval structures comprises at least one of the second downlink portion or the second uplink portion.

* * * * *